United States Patent
Kodaira et al.

(10) Patent No.: US 9,533,681 B2
(45) Date of Patent: Jan. 3, 2017

(54) VEHICLE CRUISE CONTROL DEVICE

(71) Applicants: Takahiro Kodaira, Machida (JP);
Takahiro Kojo, Gotenba (JP)

(72) Inventors: Takahiro Kodaira, Machida (JP);
Takahiro Kojo, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 57 days.

(21) Appl. No.: 14/439,797

(22) PCT Filed: Oct. 31, 2012

(86) PCT No.: PCT/JP2012/078206
§ 371 (c)(1),
(2) Date: Apr. 30, 2015

(87) PCT Pub. No.: WO2014/068711
PCT Pub. Date: May 8, 2014

(65) Prior Publication Data
US 2015/0298691 A1 Oct. 22, 2015

(51) Int. Cl.
*B60R 22/00* (2006.01)
*E05F 15/00* (2015.01)
(Continued)

(52) U.S. Cl.
CPC ........ *B60W 30/025* (2013.01); *B60G 17/0162* (2013.01); *B60G 17/0195* (2013.01);
(Continued)

(58) Field of Classification Search
CPC B60W 2550/142; B60W 10/20; B60W 30/10; B60W 2710/207; B60W 10/22; B60W 30/025; B60W 40/076; B60W 40/112; B60W 2720/18; B62D 15/025; B62D 6/04; B62D 6/00; B62D 111/00; B62D 119/00; B62D 113/00; B62D 101/00; B60G 17/0195; B60G 2202/135; B60G 2202/42; B60G 17/0162; B60G 2400/252; B60G 2400/0523; B60G 2400/0521; B60G 21/0555; B60G 2400/42; B60G 2400/412; B60G 2400/0516; B60G 2400/0511; B60G 2400/204; B60G 2400/104; B60G 2500/40; B60G 2800/012; B60G 21/055; B60G 17/015
(Continued)

(56) References Cited

U.S. PATENT DOCUMENTS 7,308,961 B2 * 12/2007 Satou ..................... B60K 31/04
180/170
2001/0027368 A1 * 10/2001 Minowa ............ B60W 30/1819
701/70

(Continued)

FOREIGN PATENT DOCUMENTS

JP 2007-168660 A 7/2007
JP 2008-290595 A 12/2008
(Continued)

*Primary Examiner* — Jaime Figueroa
(74) *Attorney, Agent, or Firm* — Sughrue Mion, PLLC

(57) ABSTRACT

Provided is a vehicle cruise control device 10 that performs trajectory control for causing a vehicle to travel along a traveling road by steering vehicle wheels. The vehicle cruise control device includes: a roll control device (active stabilizers 56 and 58, etc.) configured to control a lateral-direction inclination angle of a vehicle body; and an inclination angle estimation device (a roll rate sensor 72, a stroke sensor 74i, etc.) configured to determine a lateral-direction inclination of a traveling road. When the trajectory control is executed in a situation in which the vehicle travels on a laterally inclined traveling road (S150, S250, S300, S500), the lateral-direction inclination angle of the vehicle body is controlled by the roll control device so that the lateral-
(Continued)

direction inclination angle of the vehicle body is greater than 0 and smaller than the lateral-direction inclination angle of the traveling road (S450).

9 Claims, 20 Drawing Sheets

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| B60W 30/02 | (2012.01) |
| B60G 17/0195 | (2006.01) |
| B62D 15/02 | (2006.01) |
| B60G 17/016 | (2006.01) |
| B60G 21/055 | (2006.01) |
| B62D 6/04 | (2006.01) |
| B60W 10/20 | (2006.01) |
| B60W 10/22 | (2006.01) |
| B60W 30/10 | (2006.01) |
| B60W 40/076 | (2012.01) |
| B60W 40/112 | (2012.01) |

(52) U.S. Cl.
CPC ......... *B60G 21/0555* (2013.01); *B60W 10/20* (2013.01); *B60W 10/22* (2013.01); *B60W 30/10* (2013.01); *B60W 40/076* (2013.01); *B60W 40/112* (2013.01); *B62D 6/04* (2013.01); *B62D 15/025* (2013.01); *B60G 2202/135* (2013.01); *B60G 2202/42* (2013.01); *B60G 2400/0511* (2013.01); *B60G 2400/0516* (2013.01); *B60G 2400/0521* (2013.01); *B60G 2400/0523* (2013.01); *B60G 2400/104* (2013.01); *B60G 2400/204* (2013.01); *B60G 2400/252* (2013.01); *B60G 2400/412* (2013.01); *B60G 2400/42* (2013.01); *B60G 2500/40* (2013.01); *B60G 2800/012* (2013.01); *B60W 2550/142* (2013.01); *B60W 2710/207* (2013.01); *B60W 2720/18* (2013.01)

(58) Field of Classification Search
USPC .......................................... 701/1, 48, 91, 93
See application file for complete search history.

(56) References Cited

U.S. PATENT DOCUMENTS

| | | | |
|---|---|---|---|
| 2006/0253240 A1* | 11/2006 | Rao ..................... | B60W 50/035 701/48 |
| 2007/0067085 A1* | 3/2007 | Lu ........................... | B60T 8/172 701/70 |
| 2011/0264329 A1 | 10/2011 | Limpibunterng et al. | |
| 2011/0276216 A1* | 11/2011 | Vaughan ............... | B60W 10/06 701/31.4 |
| 2014/0309803 A1* | 10/2014 | You .......................... | G01C 9/02 701/1 |
| 2015/0134224 A1* | 5/2015 | Vaughan ............. | B60W 30/143 701/93 |
| 2015/0217771 A1* | 8/2015 | Kelly ...................... | B60T 8/175 701/93 |
| 2015/0217778 A1* | 8/2015 | Fairgrieve ........... | B60W 50/082 701/37 |
| 2016/0214645 A1* | 7/2016 | Owen .................... | B62D 6/003 |

FOREIGN PATENT DOCUMENTS

| | | |
|---|---|---|
| JP | 5287871 B2 | 6/2013 |
| JP | 2013-147056 A | 8/2013 |

* cited by examiner

VEHICLE CRUISE CONTROL DEVICE

CROSS REFERENCE TO RELATED APPLICATIONS

This application is a National Stage of International Application No. PCT/JP2012/078206, filed on Oct. 31, 2012, the contents of all of which are incorporated herein by reference in their entirety.

TECHNICAL FIELD

The present invention relates to a vehicle cruise control device, and more specifically relates to a vehicle cruise control device that causes a vehicle to travel along a traveling road by steering wheels.

BACKGROUND ART

As a cruise control device for a vehicle such as an automobile, a cruise control device is already known that performs trajectory control by calculating a target rudder angle of steerable wheels for causing a vehicle to travel along a traveling road, and controlling the rudder angle of the steerable wheels so that the rudder angle coincides with the target rudder angle by using a rudder angle varying device. An exemplary cruise control device of this type is disclosed in WO2010/073400. In the cruise control device of this type, the rudder angle of steerable wheels is controlled by a rudder angle control device so that the rudder angle coincides with a target rudder angle, independently from a steering operation by a driver.

SUMMARY OF INVENTION

Technical Problem

Generally, in the case where a vehicle travels on a laterally inclined traveling road with respect to the vehicle, due to a component that is a component of gravity working on the vehicle body and that is parallel to the inclination of the traveling road, the vehicle body is rolled by an angle equal to or greater than the inclination angle of the traveling road, and at the same time, the vehicle is energized toward the lower side of the inclination. In the case where the vehicle is going straight on a laterally inclined road, therefore, the driver performs a steering operation and a steering-keeping operation in such a manner that front wheels should be turned toward the upper side of the inclination so that the vehicle should not move toward the lower side of the inclination.

When trajectory control is started by a cruise control device in such a situation, the rudder angle of front wheels is maintained by a rudder angle varying device, but as the vehicle is in a state of going straight, the driver returns the steering wheel to a straight traveling position. Thus, the steering wheel has to be rotated so as to return to the straight traveling position although the vehicle is kept in the state of going straight, an occupant unavoidably feels discomfort, and this discomfort becomes more remarkable as the inclination angle of the traveling road is greater.

Further, when trajectory control is executed by the cruise control device and the trajectory of the vehicle comes to coincide with the target trajectory, the control quantity of trajectory control becomes 0 and the rudder angle of the front wheels becomes 0, which causes the vehicle be energized by a gravity component in the inclination direction of the traveling road and be moved toward the lower side of the inclination. Then, the cruise control device turns the front wheels again toward the upper side of the inclination so that the trajectory of the vehicle returns to the target trajectory. Accordingly, the rudder angle of the front wheels is repeatedly increased/decreased, which causes the vehicle to meander. This also causes the occupant to unavoidably feel discomfort, and this discomfort also becomes more remarkable as the inclination angle of the traveling road is greater.

Since the factor causing the discomfort as mentioned above is an inclination of the vehicle body, the reduction of the discomfort may be attempted by reducing the inclination angle of the vehicle body while the vehicle is traveling a laterally inclined road.

An angle of inclination in the lateral direction of a traveling road such as a cant of a road surface, however, is not so great, and a force working on the vehicle body in the lateral direction is small as compared with that when the vehicle sharply turns. Even if, therefore, an anti-roll moment is caused by a conventional common roll control device so as to reduce rolling of the vehicle body based on a lateral acceleration of the vehicle, it is impossible to effectively reduce the inclination angle of the vehicle body and hence it is impossible to effectively reduce the discomfort as described above.

Besides, when a high anti-roll moment is generated so that the discomfort is surely reduced, a roll control quantity upon turning becomes excessively great, which makes the attitude of the vehicle upon turning unnatural. Further, when a high anti-roll moment is generated and the inclination angle of the vehicle body becomes substantially 0, the force working on the vehicle body in the lateral direction thereof becomes 0 as well, which results in that the rudder angle of the front wheels becomes 0 even if trajectory control is executed. Therefore, irrespective of whether trajectory control is executed or not, the rudder angle of the front wheels and the rotation angle of the steering wheel remain unchanged, and the driver becomes unable to determine whether trajectory control is being executed or not, by referring to changes in the rotation angle of the steering wheel.

The present invention was made in light of the above-described problem occurring when a vehicle on which a conventional cruise control device is mounted travels on a laterally inclined road. It is a principal object of the present invention to reduce discomfort that an occupant of a vehicle feels, without making it difficult to determine whether trajectory control is executed, the discomfort being caused by trajectory control executed in a situation where the vehicle is traveling on a laterally inclined road.

Solution to Problem and Advantageous Effects of Invention

The above-described principal object is achieved by a vehicle cruise control device that performs trajectory control for causing a vehicle to travel along a traveling road by steering a wheel. The vehicle cruise control device includes: a roll control device configured to control a lateral-direction inclination angle of a vehicle body; and an inclination angle estimation device configured to determine a lateral-direction inclination of a traveling road, wherein, when the trajectory control is executed in a situation in which the vehicle travels on a laterally inclined traveling road, the lateral-direction inclination angle of the vehicle body is controlled by the roll control device so that the lateral-direction inclination angle of the vehicle body is greater than 0 and smaller than the lateral-direction inclination angle of the traveling road.

According to the above-described configuration, when the trajectory control is executed in a situation in which the vehicle travels on a laterally inclined traveling road, the lateral-direction inclination angle of the vehicle body is controlled by the roll control device to a value greater than 0 and smaller than the lateral-direction inclination angle of the traveling road. Therefore, as compared with the case where the lateral-direction inclination angle of the vehicle body is not reduced by the roll control device, the lateral force working on the vehicle body is smaller. As a result, between a situation in which trajectory control is not executed and a situation in which trajectory control is executed, the rudder angles of the steerable wheels and the rotation angles of the steering wheel have smaller differences.

It is therefore possible to decrease a quantity of change in the rotation angle of the steering wheel and a change speed of the same when the trajectory control is started or ended in a situation in which the vehicle travels on a laterally inclined traveling road, which makes it possible to reduce discomfort that an occupant of the vehicle feels.

Further, the lateral-direction inclination angle of the vehicle body is controlled so as to be greater than 0 and smaller than the lateral-direction inclination angle of the traveling road. Therefore, as compared with the case where the control quantity of the roll control device is small and the lateral-direction inclination angle of the vehicle body is greater than the lateral-direction inclination angle of the traveling road, discomfort that the occupant of the vehicle feels can be reduced surely. By contraries, as compared with the case where the control quantity of the roll control device is excessively large and the lateral-direction inclination angle of the vehicle body is controlled to 0, the driver can surely determine whether trajectory control is executed, according to a change in the rotation angle of the steering wheel when trajectory control is started or ended.

The above-described configuration may be such that, when starting the trajectory control in the situation in which the vehicle travels on the laterally inclined traveling road, the cruise control device starts the control of the lateral-direction inclination angle of the vehicle body by the roll control device as well at the same time, and gradually increases a control quantity for the lateral-direction inclination angle of the vehicle body.

According to the above-described configuration, as compared with the case where the control of the lateral-direction inclination angle of the vehicle body by the roll control device is started with a delay to trajectory control, discomfort can be reduced effectively that the occupant feels due to changes in the rotation angle of the steering wheel and the meandering of the vehicle.

Further, the above-described configuration may be such that, when ending the trajectory control in the situation in which the vehicle travels on the laterally inclined traveling road, the cruise control device starts the ending of the control of the lateral-direction inclination angle of the vehicle body by the roll control device as well at the same time, and gradually decreases a control quantity for the lateral-direction inclination angle of the vehicle body.

According to the above-described configuration, as compared with the case where the control of the lateral-direction inclination angle of the vehicle body by the roll control device is ended with a delay to trajectory control, it is possible to effectively cause the occupant to recognize that trajectory control is to end.

Further, the above-described configuration may be such that, when starting the trajectory control in the situation in which the vehicle travels on the laterally inclined traveling road, the cruise control device starts the control of the lateral-direction inclination angle of the vehicle body by the roll control device in advance to the starting of the trajectory control, and gradually increases a control quantity for the lateral-direction inclination angle of the vehicle body.

According to the above-described configuration, as compared with the case where the control of the lateral-direction inclination angle of the vehicle body by the roll control device is started simultaneously with trajectory control, the occupant is surely allowed to recognize earlier that trajectory control is to be started. Further, discomfort can be reduced effectively that the occupant feels due to changes in the rotation angle of the steering wheel and the meandering of the vehicle.

Further, the above-described configuration may be such that, when ending the trajectory control in the situation in which the vehicle travels on the laterally inclined traveling road, the cruise control device starts the ending of the control of the lateral-direction inclination angle of the vehicle body by the roll control device in advance to the ending of the trajectory control, and gradually decreases a control quantity for the lateral-direction inclination angle of the vehicle body.

According to the above-described configuration, as compared with the case where the control of the lateral-direction inclination angle of the vehicle body by the roll control device is ended simultaneously with trajectory control, the occupant is surely allowed to recognize earlier that trajectory control is to be ended. Further, discomfort can be reduced effectively that the occupant feels due to changes in the rotation angle of the steering wheel.

Further, the above-described configuration may be such that the inclination determination device estimates the lateral-direction inclination angle of the traveling road, and the cruise control device calculates a target inclination angle of the vehicle body that is greater than 0 and smaller than the lateral-direction inclination angle of the traveling road, and control the lateral-direction inclination angle of the vehicle body so that the lateral-direction inclination angle of the vehicle body coincides with the target inclination angle.

According to the above-described configuration, as compared with the case where the target inclination angle of the vehicle body is calculated and the lateral-direction inclination angle of the vehicle body is not controlled so as to coincide with the target inclination angle, the lateral-direction inclination angle of the vehicle body can be controlled surely to an angle that is greater than 0 and smaller than the lateral-direction inclination angle of the traveling road.

Further, the above-described configuration may be such that the inclination determination device estimates a lateral-direction inclination angle of the vehicle body in an absolute space as an absolute inclination angle, estimates a lateral-direction inclination angle of the vehicle body with respect to the traveling road as a relative inclination angle, and estimates the lateral-direction inclination angle of the traveling road based on a difference between the absolute inclination angle and the relative inclination angle.

According to the above-described configuration, the lateral-direction inclination angle of the traveling road can be estimated surely and accurately, and therefore, the lateral-direction inclination angle of the vehicle body can be controlled to a desired angle accurately.

Further, the above-described configuration may be such that the roll control device generates an anti-roll moment based on a lateral force working on the vehicle body, thereby to control the lateral-direction inclination angle of the vehicle body, and when executing the trajectory control in the situation in which the vehicle travels on the laterally inclined traveling road, the cruise control device increases a ratio of the anti-roll moment to the lateral force working on the vehicle body, as compared with a situation that is not the situation in which the vehicle travels on the laterally inclined traveling road, thereby to control the lateral-direction inclination angle of the vehicle body so that the lateral-direction inclination angle of the vehicle body is greater than 0 and smaller than the lateral-direction inclination angle of the traveling road.

According to the above-described configuration, it is possible to avoid excessive increase in the roll control quantity of the vehicle body when the vehicle turns, and at the same time, the lateral-direction inclination angle of the vehicle body in the case where trajectory control is executed in a situation in which the vehicle travels on a traveling road inclined in a lateral direction can be surely controlled to a desired angle.

Further, the above-described configuration may be such that the cruise control device controls the lateral-direction inclination angle of the vehicle body so that the lateral-direction inclination angle of the vehicle body is equal to or greater than 0.2 times the lateral-direction inclination angle of the traveling road, and equal to or smaller than 0.8 times the lateral-direction inclination angle of the traveling road.

According to the above-described configuration, the lateral-direction inclination angle of the vehicle body is controlled to an angle equal to or greater than 0.2 times the lateral-direction inclination angle of the traveling road and equal to or smaller than 0.8 times the lateral-direction inclination angle of the traveling road. Therefore, as compared with a case where the lateral-direction inclination angle of the vehicle body is controlled to an angle smaller than 0.2 times the lateral-direction inclination angle of the traveling road, the determination of whether trajectory control is being executed can be surely made, according to a change in the rotation angle of the steering wheel when trajectory control is started or ended. Further, as compared with the case where the lateral-direction inclination angle of the vehicle body is controlled to an angle greater than 0.8 times the lateral-direction inclination angle of the traveling road, discomfort that the occupant of the vehicle feels can be reduced surely and effectively.

According to one preferable aspect of the present invention, the lateral-direction inclination angle of the vehicle body may be controlled to an angle equal to or greater than 0.3 times the lateral-direction inclination angle of the traveling road.

According to one preferable aspect of the present invention, the lateral-direction inclination angle of the vehicle body may be controlled to an angle equal to or smaller than 0.7 times the lateral-direction inclination angle of the traveling road.

According to another preferable aspect of the present invention, the cruise control device is configured to calculate a target rudder angle of a steerable wheel for causing the vehicle to travel along a target trajectory, and execute trajectory control by controlling the rudder angle of the steerable wheel to a target rudder angle, and to correct the target rudder angle of the steerable wheel so as to reduce influences of roll steer caused by the control of the lateral-direction inclination angle of the vehicle body.

DESCRIPTION OF EMBODIMENTS

The following explains several preferable embodiments of the present invention in details while referring to attached drawings.

First Embodiment

Figure 1:
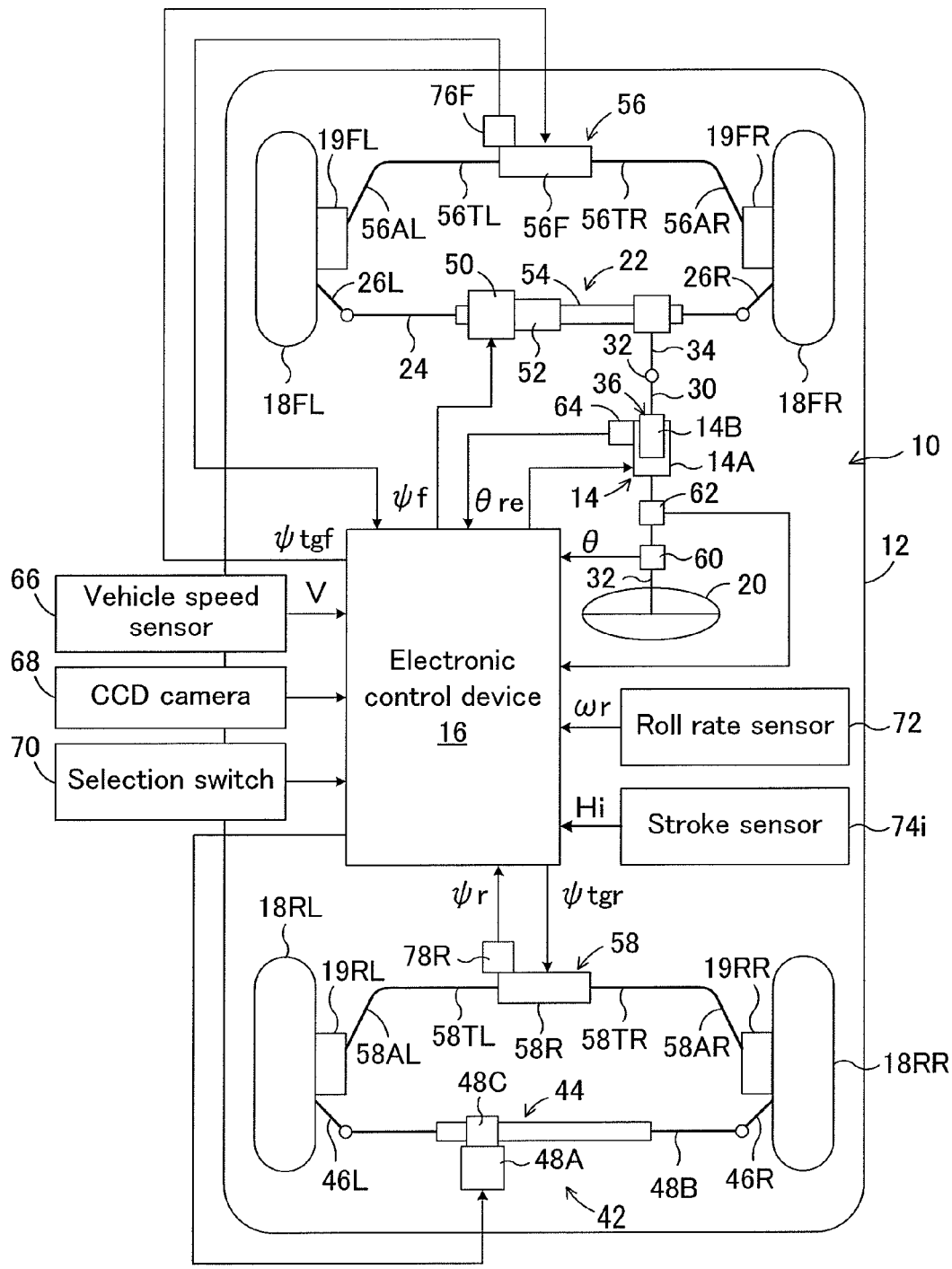
FIG. 1 illustrates a schematic configuration of First Embodiment of a vehicle cruise control device according to the present invention applied to a vehicle on which a rear wheel steering device and an active stabilizer device are mounted.

FIG. 1 illustrates a schematic configuration of First Embodiment of a vehicle cruise control device according to the present invention applied to a vehicle on which a rear wheel steering device and an active stabilizer device are mounted.

In FIG. 1, a cruise control device 10 according to the present invention is mounted on a vehicle 12, and includes a rudder angle varying device 14 and an electronic control device 16 for controlling the same. Further, in FIG. 1, "18FL" and "18FR" indicate left and right front wheels of the vehicle 12, respectively, and "18RL" and "18RR" indicate left and right rear wheels, respectively. The left and right front wheels 18FL and 18FR, which are steerable wheels, are turned by a rack-and-pinion-type power steering device 22 driven in response to an operation of a steering wheel 20 by a driver, via a rack bar 24 and tie rods 26L and 26R.

The steering wheel 20, which is a steering input means, is connected to a pinion shaft 34 of the power steering device 22 via an upper steering shaft 28, a rudder angle varying device 14, a lower steering shaft 30, and a universal joint 32 so that the steering wheel 20 is driven. The rudder angle varying device 14 includes a motor 36 for auxiliary turning drive that is linked to a lower end of the upper steering shaft 28 on a housing 14A side, and linked to an upper end of the lower steering shaft 30 on a rotor 14B side, via a deceleration mechanism that is not shown in the drawings.

Thus, the rudder angle varying device 14 rotates the lower steering shaft 30 relatively with respect to the upper steering shaft 28, thereby performing auxiliary turning drive of the left and right front wheels 18FL and 18FR relatively with respect to the steering wheel 20. Thus, the rudder angle varying device 14 functions as a variable gear ratio steering device (VGRS) for increasing/decreasing the steering gear ratio (a reciprocal of a steering transmission ratio), and also functions as a front-wheel rudder angle varying device for changing the rudder angle of the left and right front wheels independently of a steering operation by the driver As is described in detail below, the rudder angle varying device 14 is controlled by a rudder angle control unit of the electronic control device 16

The left and right rear wheels 18RL and 18RR are steered by an electric power steering device 44 of a rear wheel steering device 42 via tie rods 46L and 46R, independently of the steering of the left and right front wheels 18FL and 18FR. The rear wheel steering device 42, therefore, functions as a rudder angle varying device for the rear wheels, for changing the rudder angle of the left and right rear wheels independently of a steering operation by the driver, and is controlled by the rudder angle control unit of the electronic control device 16 as is described below.

The rear wheel steering device 42 illustrated in the drawing is an electric auxiliary steering device having a known configuration, and includes a motor 48A, and a movement conversion mechanism 48C for converting the rotation of the motor 48A into a reciprocal movement of the relay rod 48B, which is, for example, a screw-type movement conversion mechanism. The relay rod 48B composes a turning mechanism that turns and drives the left and right rear wheels 18RL and 18RR in cooperation with the tie rods 46L, 46R and a steering knuckle arm (not shown), using the reciprocal movement of the relay rod 48B.

Though not illustrated in the drawings in detail, the conversion mechanism 48C is configured in the following manner: the conversion mechanism 48C converts the rotation of the motor 48A into a reciprocal movement of the relay rod 48B, but does not transmit, to the motor 48A, a force received by the left and right rear wheels 18RL and 18RR from a road surface and transmitted to the relay rod 48B, so that the motor 48A should not be rotated by a force transmitted to the relay rod 48B.

In the embodiment illustrated in the drawing, the electric power steering device 22 is a rack-coaxial-type electric power steering device, and includes a motor 50, and a conversion mechanism 52 that converts a rotation torque of the motor 50 into a force in the direction of the reciprocating movement of the rack bar 24, for example, a ball-screw-type conversion mechanism. The electric power steering device 22 is controlled by an electric power steering device (EPS) control unit of the electronic control device 16. The electric power steering device 22 functions as a steering assist force generation device that generates an auxiliary steering force for driving the rack bar 24 relatively with respect to the housing 54, so as to reduce steering loads on the driver.

It should be noted that the rudder angle varying device 14 may have any arbitrary configuration as long as the configuration is capable of changing the rudder angle of the left and right front wheels in cooperation with the auxiliary steering assist force generation device, irrespective of a steering operation by the driver, and changing the rotation angle of the steering wheel 20. Likewise, the rear wheel steering device 42 may have any arbitrary configuration as long as the configuration is capable of changing the rudder angle of the left and right rear wheels, irrespective of a steering operation by the driver. Further, the steering assist force generation device may have any arbitrary configuration as long as the configuration is capable of generating an auxiliary steering force. A steering input device is the steering wheel 20, and the operation position thereof is indicated by a rotation angle, but the steering input device may be a joystick-type steering lever, and in this case, the operation position thereof may be indicated by a reciprocating operation position.

Between the left and right front wheels 18FL and 18FR, there is provided a front active stabilizer device 56, and between the left and right rear wheels 18RL and 18RR, there is provided a rear active stabilizer device 58. The active stabilizer devices 56 and 58 apply anti-roll moments to the vehicle (vehicle body) as required, thereby functioning as a roll angle varying device that variably controls roll stiffness of the vehicle on the front wheel side and the rear wheel side, and at the same time, increasing/decreasing the roll angle of the vehicle body.

The front active stabilizer device 56 includes a pair of torsion bar portions 56TL and 56TR that extend in the lateral direction of the vehicle, and a pair of arm parts 56AL and 56AR that are integrally connected to external ends of these torsion bar portions, respectively. The torsion bar portions 56TL and 56TR extend along a common axis line so as to be aligned with each other, and are rotatably supported on the vehicle body with brackets (not shown) being interposed therebetween, respectively, so as to rotatable around the axis line thereof. The arm parts 56AL and 56AR extend in the front-rear direction of the vehicle so as to cross the torsion bar portions 56TL and 56TR, respectively. The external ends of the arm parts 56AL and 56AR are linked to suspension members 19FL and 19FR of the left and right front wheels 18FL and 18FR, via rubber bush devices (not shown), respectively, the suspension members 19FL and 19FR being like suspension arms.

The active stabilizer device 56 includes an actuator 56F between the torsion bar portions 56TL and 56TR, and the actuator 56R incorporates a motor. The actuator 56F is controlled by an active stabilizer control unit of the electronic control device 16, and rotates the torsion bar portions 56TL and 56TR relatively as required, thereby increasing/decreasing an anti-roll moment that is applied to the vehicle body at positions of the left and right front wheels.

Likewise, the active stabilizer device 58 includes a pair of torsion bar portions 58TL and 58TR that extend in the lateral direction of the vehicle, and a pair of arm parts 58AL and 58AR that are integrally connected to external ends of these torsion bar portions, respectively. The torsion bar portions 58TL and 58TR extend along a common axis line so as to be aligned with each other, and are rotatably supported on the vehicle body with brackets (not shown) being interposed therebetween, respectively, so as to rotatable around the axis line thereof. The arm parts 58AL and 58AR extend in the front-rear direction of the vehicle so as to cross the torsion bar portions 58TL and 58TR, respectively. The external ends of the arm parts 58AL and 58AR are linked to suspension members 19RL and 19RR of the left and right rear wheels 18RL and 18RR, via rubber bush devices (not shown), respectively, the suspension members 19RL and 19RR being like suspension arms.

The active stabilizer device 58 has an actuator 58R between the torsion bar portions 58TL and 58TR, and the actuator 58R incorporates a motor. The actuator 58R is controlled by an active stabilizer control unit of the electronic control device 16, and rotates the torsion bar portions 58TL and 58TR relatively as required, thereby increasing/decreasing an anti-roll moment that is applied to the vehicle body at positions of the left and right rear wheels.

It should be noted that the mechanics itself of the active stabilizer devices 56 and 58 is not the essence of the present invention, and the active stabilizer devices 56 and 58 may have any arbitrary configurations known in the present technical field as long as they are capable of variably controlling the roll angle of the vehicle.

In the embodiment illustrated in the drawing, the upper steering shaft 28 is provided with a steering angle sensor 60 that detects a rotation angle of the upper steering shaft as a steering angle $\theta$. The pinion shaft 34 is provided with a steering torque sensor 62 that detects a steering torque MT. The rudder angle varying device 14 is provided with a rotation angle sensor 64 that detects a relative rotation angle $\theta re$ thereof, that is, a relative rotation angle of the lower steering shaft 30 with respect to the upper steering shaft 28.

A signal indicating a steering angle $\theta$, a signal indicating a steering torque MT, and a signal indicating a relative rotation angle $\theta re$, together with a signal indicating a vehicle speed V detected by a vehicle speed sensor 66, are fed to the rudder angle control unit and an EPS control unit of the electronic control device 16. It should be noted that the rotation angle of the lower steering shaft 30 may be detected, and the relative rotation angle $\theta re$ may be obtained as a difference between the steering angle $\theta$ and the rotation angle of the lower steering shaft 30.

Further, the vehicle 12 is provided with a CCD camera 68 for picking up a forward image of the vehicle and a selection switch 70 that is to be operated by an occupant of the vehicle for selecting whether trajectory control (also referred to as "LKA control") for causing the vehicle to travel along a traveling road should be executed. A signal indicating information of a forward image of the vehicle picked up by the CCD camera 68 and a signal indicating the position of the selection switch 70 are fed to a cruise control unit of the electronic control device 16. Forward image information of the vehicle and information about a traveling road may be acquired by a means other than a CCD camera.

Further, the vehicle 12 is provided with a roll rate sensor 72 that detects a roll rate $\omega r$ of the vehicle, and stroke sensor 74$i$ that detects suspension strokes Hi (i=FL,FR,RL,RR) at positions of the front left wheel, the front right wheel, the rear left wheel, and the rear right wheel, respectively. A signal indicating the roll rate $\omega r$ and signals indicating the suspension strokes Hi are also fed to the cruise control unit of the electronic control device 16.

Further, the actuator 56F of the front active stabilizer device 56 is provided with a rotary encoder 76F that detects a rotation angle $\psi f$ of the actuator. Likewise, the actuator 58R of the rear active stabilizer device 58 is provided with a rotary encoder 78R that detects a rotation angle $\psi r$ of the actuator. Signals indicating the rotation angles $\psi f$ and $\psi r$ are also fed to the cruise control unit of the electronic control device 16.

Each of the control units of the electronic control device 16 may include a CPU, a ROM, a RAM, and an input/output port device, and these may include microcomputers that are connected with one another by bidirectional common buses. Further, the steering angle sensor 60, the steering torque sensor 62, the rotation angle sensor 64, and the roll rate sensor 72 detect a steering angle θ, a steering torque MT, a relative rotation angle θre, and a roll rate ωr, respectively, which have positive values in the case where the vehicle is steered or turned in the left turn direction.

As is described in detail below, the electronic control device 16 controls the rudder angle varying device 14, the rear wheel steering device 42 and the like according to the flowcharts illustrated in FIG. 2 and the like so as to perform trajectory control, thereby causing the vehicle to travel along a traveling road.

Further, the electronic control device 16 controls the electric power steering device 22 based on the steering torque MT and the like, so as to reduce steering loads on the driver, and assists the rudder angle varying device 14 to control the rudder angle of the left and right front wheels so that the same coincides with a rudder angle necessary for trajectory control.

Further, the electronic control device 16 estimates a lateral-direction inclination angle of a traveling road based on the roll angle of the vehicle body and the stroke of each wheel, and determines, based on the estimation result, whether the vehicle travels on a laterally inclined road. Then, when executing trajectory control in a situation where the vehicle is traveling on a laterally inclined road, the electronic control device 16 performs roll angle control, which is controlled by the active stabilizer devices 56 and 58, to control a roll angle of a vehicle body so that the roll angle of the vehicle body has a value greater than 0 and smaller than an inclination angle of the traveling road.

In particular, in First Embodiment, when starting trajectory control in a situation in which the vehicle is traveling on a laterally inclined road, the electronic control device 16 starts the vehicle body roll angle control at the same time. Further, when ending trajectory control in a situation in which the vehicle is traveling on a laterally inclined road, the electronic control device 16 ends the vehicle body roll angle control at the same time.

Figure 28:
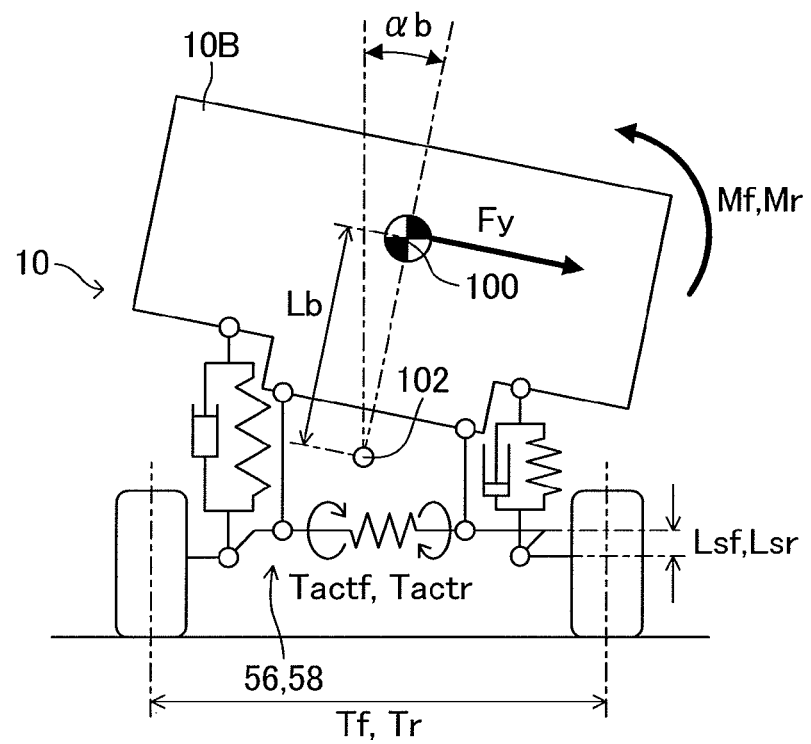
FIG. 28 illustrates a state in which a body of a vehicle having an active stabilizer device is rolled.

Next, referring to FIG. 28, the following describes how target actuator torques Tstgf and Tstgr of the of the active stabilizer devices 56 and 58 are calculated, in the case where the vehicle body 12B rolls around a roll center 102 due to a lateral force Fy working on the center of gravity 100 of the vehicle body 12B. It should be noted that when the weight of the vehicle body is given as "W" (a product of a mass and a gravitational acceleration) and an inclination angle of the vehicle body is given as "αb", the lateral force Fy is given as "W sin αb".

As illustrated in FIG. 28, the distance between the center of gravity 100 of the vehicle body 12B and the roll center 102 is given as "Lb", and anti-roll moments of the active stabilizer devices 56 and 58 are given as "Mf" and "Mr", respectively. Further, roll stiffnesses according to suspensions of the front wheels and the rear wheels are given as "Ksrf" and "Ksrr", respectively. Then, according to the balance of moments around the roll center 102, the expression (1) below is established:

$$(Ksrf+Ksrr)\alpha b = FyLb - (Mf+Mr) \tag{1}$$

A ratio of roll moments supported by suspensions of the front and rear wheels can be considered to be equal to a roll stiffness distribution ratio. Therefore, a roll stiffness distribution ratio of the front wheels is given as "Rsd", and then, the expression (2) below is established:

$$Rsd = \frac{Ksrf \alpha b + Mf}{(Ksrf + Ksrr)\alpha b + Mf + Mr} \tag{2}$$

Based on the expressions (1) and (2), the expressions (3) and (4) below are established:

$$Mf = FyLsRsd - Ksrf\alpha b \tag{3}$$

$$Mr = FyLs(1-Rsd) - Ksr\alpha b \tag{4}$$

The treads of the front wheels and the rear wheels are given as "Tf" and "Tr", respectively, and then, the strokes Hf and Hr of the front wheels and the rear wheels are expressed by the expressions (5) and (6) below, respectively:

$$Hf = \frac{Tf}{2}\tan\alpha b \tag{5}$$

$$Hr = \frac{Tr}{2}\tan\alpha b \tag{6}$$

The wheel rates of the front wheels and the rear wheels as to one wheel each are given as "Kf" and "Kr", and then, a vertical force Fsf which causes suspension of each wheel of the front wheels to be generated and a vertical force Fsr that causes suspension of each wheel of the rear wheels to be generated are expressed by the expressions (7) and (8) below, respectively:

$$Fsf = Kf\frac{Tf}{2}\tan\alpha b \tag{7}$$

$$Fsr = Kr\frac{Tr}{2}\tan\alpha b \tag{8}$$

Accordingly, the anti-roll moments Mf and Mr generated at the front wheels and the rear wheels are expressed by the expressions below (9) and (10), respectively:

$$Mf = 2\left(Kf\frac{Tf}{2}\tan\alpha b\right)\frac{Tf}{2} \tag{9}$$
$$= \frac{Tf^2 Kf}{2}\alpha b$$

$$Mr = 2\left(Kr\frac{Tr}{2}\tan\alpha b\right)\frac{Tr}{2} \tag{10}$$
$$= \frac{Tr^2 Kr}{2}\alpha b$$

Therefore, the roll stiffnesses Ksrf and Ksrr according to the suspensions of the front wheels and the rear wheels are expressed by the expressions (11) and (12) below:

$$Ksf = \frac{Tf^2 Kf}{2} \tag{11}$$

$$Ksr = \frac{Tr^2 Kr}{2} \tag{12}$$

In what is described above, forces generated when the torsion bar portions of the active stabilizer devices 56 and 58 are twisted by external forces are not taken into consideration. Further, the roll angle of the vehicle body does not contain a roll angle due to an inclination of the vehicle body caused by elastic deformations of tires.

When the vehicle body rolls, ends of left and right arm parts of the active stabilizer device vertically move in opposite directions, respectively. Spring constants of the active stabilizer devices 56 and 58 regarding the difference between the heights in the vertical direction of the ends of the left and right arm parts are given as "Kssf" and "Kssr". Further, arm ratios of the active stabilizer devices 56 and 58 (ratios of the lengths of the arm parts with respect to torque generation arm lengths of the actuators) are given as "Rsaf" and "Rsar".

Spring constants of the front and rear wheels in the radial direction of the tires are given as "Kwf" and "Kwr", respectively, and wheel rates of the front and rear wheels regarding spring forces of suspension springs are given as "Kspf" and "Kspr", respectively. Wheel rates Kf and Kr of the front and rear wheels per one wheel in which elastic deformations of the torsion bar portions of the active stabilizer devices, the tires, and the suspension springs are taken into consideration are expressed by the expressions (13) and (14) below, respectively:

$$Kf = \frac{Kwf(Kspf + 2KssfRsaf^2)}{Kwf + Kspf + 2KssfRsaf^2} \quad (13)$$

$$Kr = \frac{Kwr(Kspr + 2KssrRsar^2)}{Kwr + Kspr + 2KssrRsar^2} \quad (14)$$

Further, the arm lengths of the active stabilizer devices 56 and 58 are given as "Lsf" and "Lsr", respectively, and then, torques Tactf and Tactr that the actuators 56F and 58R should generate in order to generate the anti-roll moments Mf and Mr are expressed by the expressions (15) and (16) below, respectively:

$$Tacf = \frac{Lsf}{TfRsaf} Mf \quad (15)$$

$$Tacr = \frac{Lsr}{TrRsar} Mr \quad (16)$$

It should be noted that the wheel rates Kf and Kr of the front and rear wheels per one wheel expressed by the expressions (13) and (14) described above are uniquely determined according to the specifications of the vehicle. Therefore, the roll stiffness Ksrf and Ksrr expressed by the expressions (11) and (12) described above, which are according to the suspensions of the front and rear wheels, are uniquely determined according to the specifications of the vehicle, which makes it possible to preliminarily determine the roll stiffnesses Ksrf and Ksrr as constants, respectively.

<Cruise Control Routine>

Figure 2:
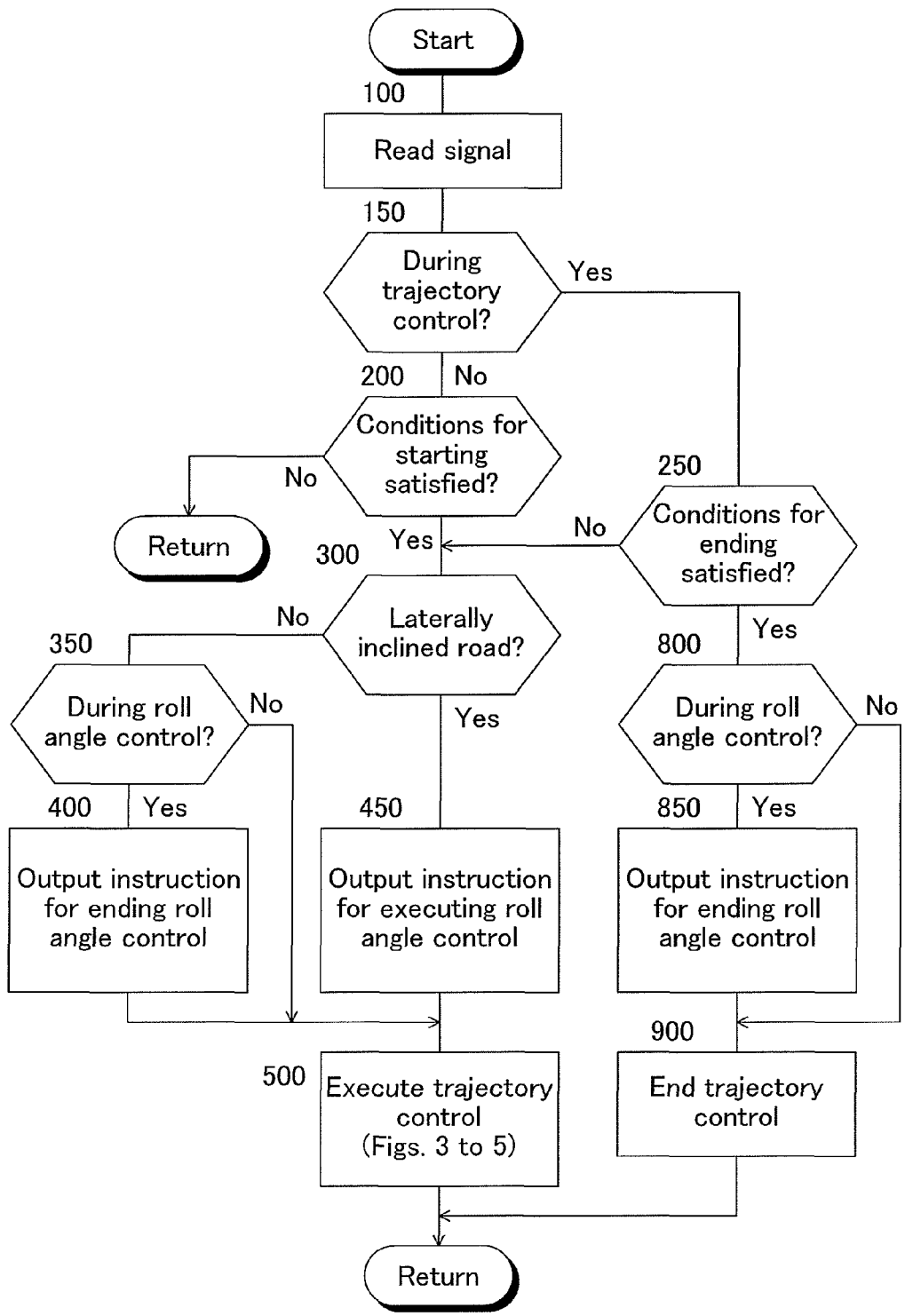
FIG. 2 is a flowchart illustrating a cruise control routine in First Embodiment according to the present invention achieved by a cruise control unit of an electronic control device so that trajectory control should be performed in association with roll angle control

Next, while referring to the flowchart illustrated in FIG. 2, the following describes an outline of a cruise control routine in First Embodiment according to the present invention, achieved by the cruise control unit so that trajectory control is executed in association with roll angle control. It should be noted that the control according to the flowchart illustrated in FIG. 2 is started by closing of an ignition switch (not illustrated in the drawings), and is repeatedly executed every predetermined time. This applies to controlling operations according to flowcharts illustrated in FIGS. 6 and 8, which are described below.

First, in step 100, a signal indicating the steering angle θ detected by the steering angle sensor 60, and the like, are read in, and in step 150, it is determined whether trajectory control is being executed. When the result of the determination is affirmative, the control proceeds to step 250, and when the result of the determination is negative, the control proceeds to step 200.

In step 200, it is determined whether conditions for starting trajectory control are satisfied. When the result of the determination is negative, the control returns to step 100, and when the result of the determination is affirmative, the control proceeds to step 300.

In this case, when any of the following is determined to have occurred, it may be determined that the conditions for starting trajectory control are satisfied.

a1: The selection switch 70 is switched from OFF to ON.
a2: A situation where normal trajectory control is inexecutable has changed to a situation where normal trajectory control is executable; for example, a situation where vehicle forward information cannot be acquired by the CCD camera 68 has changed to a situation where vehicle forward information can be acquired.

In step 250, it is determined whether conditions for ending trajectory control are satisfied. When the result of the determination is affirmative, the control proceeds to step 800, and when the result of the determination is negative, the control proceeds to step 300.

In this case, when any of the following is determined to have occurred, it may be determined that the conditions for ending trajectory control are satisfied.

b1: The selection switch 70 is switched from ON to OFF.
b2: It has become impossible to execute normal trajectory control; for example, it is impossible to acquire vehicle forward information such as white lines of the traveling road with the CCD camera 68.

Figure 8:
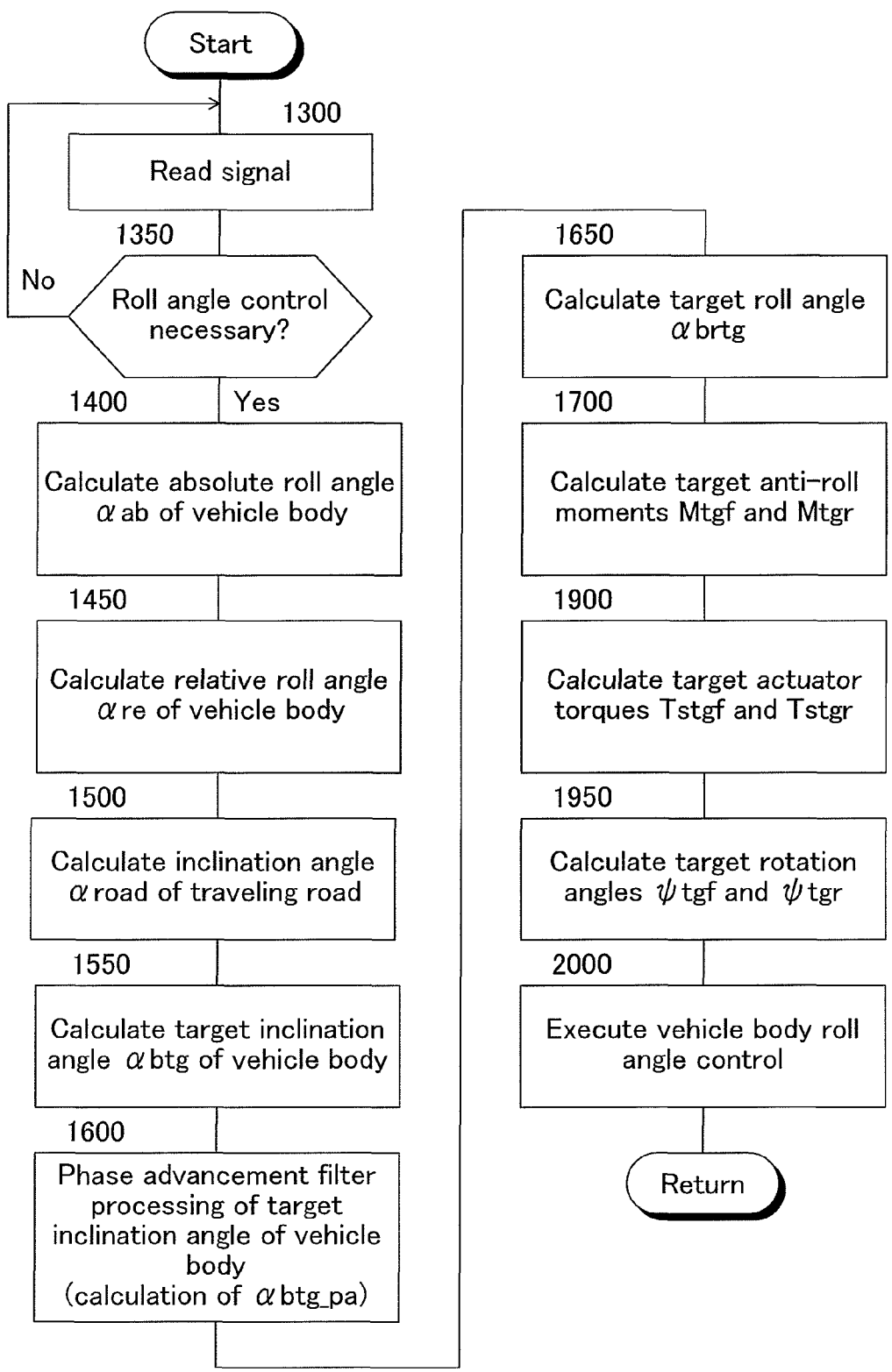
FIG. 8 is a flowchart illustrating a roll angle control routine for controlling a roll angle of a vehicle body in First and Second Embodiments.

In step 300, it is determined whether the traveling road is a laterally inclined road by, for example, determining whether the absolute value of the lateral-direction inclination angle αroad of the traveling road calculated according to the flowchart illustrated in FIG. 8 is equal to or greater than a reference value (positive constant). When the result of the determination is affirmative, the control proceeds to step 450, and when the result of the determination is negative, the control proceeds to step 350.

In step 350, the front active stabilizer device 56 and the rear active stabilizer device 58 are controlled by the active stabilizer control unit of the electronic control device 16, whereby it is determined whether roll angle control is executed. When the result of the determination is negative, the control proceeds to step 500, and when the result of the determination is affirmative, the control proceeds to step 400.

In step 400, the cruise control unit of the electronic control device 16 outputs an instruction for ending roll angle control to the active stabilizer control unit, whereby roll angle control by the active stabilizer control unit is ended.

In step 450, the cruise control unit of the electronic control device 16 outputs an instruction for executing roll angle control to the active stabilizer control unit, whereby roll angle control by the active stabilizer control unit is executed.

In step 500, as is described in detail below, trajectory control is executed according to the flowcharts illustrated in FIGS. 3 to 5, whereby the rudder angle of the front and rear wheels are controlled so that the vehicle travels along the traveling road.

In step 800, an instruction for ending roll angle control in step 850, which is to be described below, has not been output yet, and it is determined whether roll angle control is being continued. When the result of the determination is negative, the control proceeds to step 900, and when the result of the determination is affirmative, the control proceeds to step 850.

In step 850, an instruction for ending roll angle control is output from the cruise control unit of the electronic control device 16 to the active stabilizer control unit, whereby roll angle control by the active stabilizer control unit is ended.

Figure 3:
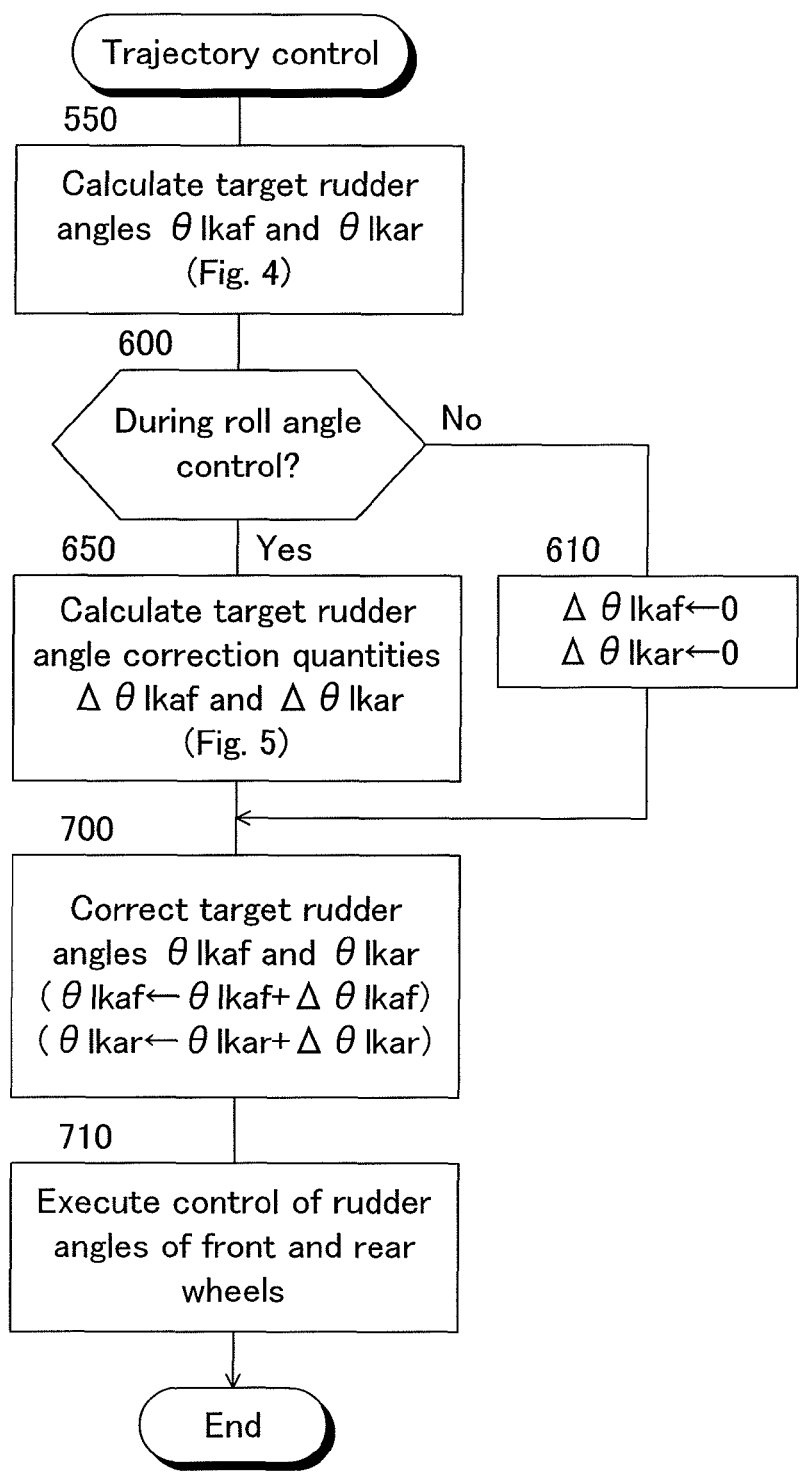
FIG. 3 is a flowchart illustrating trajectory control routine executed in step 500 in the flowchart illustrated in FIG. 2.
Figure 4:
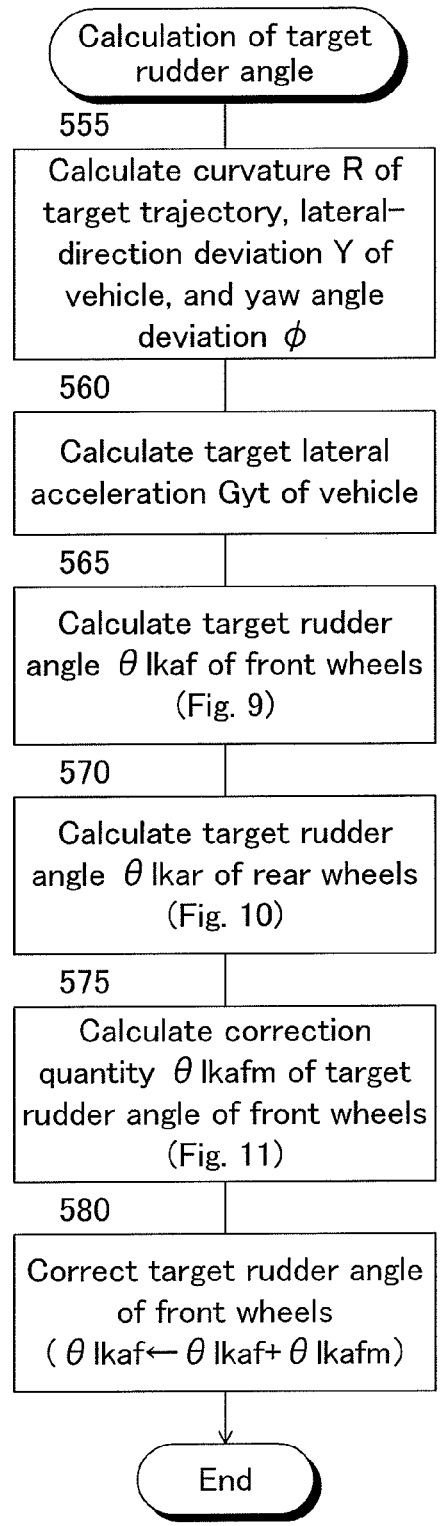
FIG. 4 is a flowchart illustrating a target rudder angle calculation routine for calculating target rudder angles of front and rear wheels, the routine being executed in step 550 in the flowchart illustrated in FIG. 3.
Figure 5:
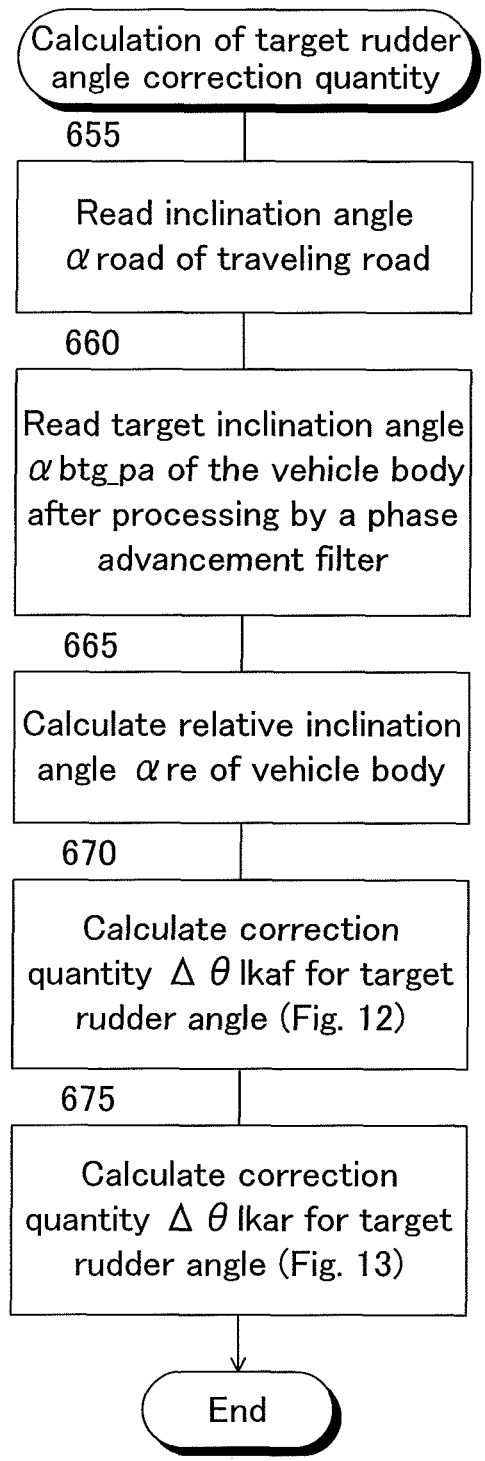
FIG. 5 is a flowchart illustrating a correction quantity calculation routine for calculating correction quantities for target rudder angles of front and rear wheels, the routine being executed in step 650 in the flowchart illustrated in FIG. 3.

In step 900, trajectory control executed according to the flowcharts illustrated in FIGS. 3 to 5 is ended.

It should be noted that, though not indicated in the flowchart illustrated in FIG. 2, control quantities in trajectory control and roll angle control are gradually increased when operations for controlling the same are started, and when operations for controlling the same are ended, the control quantities are gradually reduced, so that a vehicle traveling state should not change sharply.

<Trajectory Control Routine>

Next, while referring to the flowcharts illustrated in FIGS. 3 to 5, the following describes trajectory control routine executed in step 500 described above.

First, in step 550, as is described in detail below, a target rudder angle θlkaf of the front wheels and a target rudder angle θlkar of the rear wheels for causing the vehicle to travel along a traveling road are calculated according to the flowchart illustrated in FIG. 4.

In step 600, it is determined whether roll angle control is executed by controlling the front active stabilizer device 56 and the rear active stabilizer device 58 by the active stabilizer control unit of the electronic control device 16. When the result of the determination is affirmative, the control proceeds to step 650. When the result of the determination is negative, then in step 610, a correction quantity Δθlkaf for the target rudder angle of the front wheels and a correction quantity Δθlkar of the target rudder angle of the rear wheels for eliminating influences of roll steer are set to 0 both, and thereafter, the control proceeds to step 700.

In step 650, a correction quantity Δθlkaf for the target rudder angle of the front wheels and a correction quantity Δθlkar of the target rudder angle of the rear wheels for eliminating influences of roll steer are calculated according to the flowchart illustrated in FIG. 5, and thereafter, the control proceeds to step 700.

In step 700, correction quantities Δθlkaf and Δθlkar are added to the target rudder angle θlkaf of the front wheels and the target rudder angle θlkar of the rear wheels, respectively, whereby the target rudder angles θlkaf and θlkar of the front wheels and rear wheels, corrected so that influences of roll steer are eliminated, are calculated.

In step 710, the rudder angle varying device 14 and the rear wheel steering device 42 are controlled so that the rudder angles of the front wheels and the rear wheels coincide with the target rudder angles θlkaf and θlkar after correction, respectively, whereby trajectory control is executed so that the vehicle travels along the traveling road.

In step 555 in the target rudder angle calculation routine illustrated in FIG. 4 for calculating the target rudder angles of the front wheels and the rear wheels, a target trajectory of the vehicle along the traveling road is decided by analyzing information of a forward image of the vehicle picked up by the CCD camera 68 and the like. Further, a curvature R (reciprocal of radius) of the target trajectory, a deviation Y of the vehicle in the lateral direction with respect to the target trajectory, and a deviation φ of yaw angle are calculated.

It should be noted that the target trajectory of the vehicle may be decided based on information from a navigation device that is not illustrated, or may be decided based on combination of image information analysis and information from a navigation device. Further, the curvature R of the target trajectory and the like are parameters necessary for executing trajectory control for causing a vehicle to travel along a target trajectory, but since the calculations of the same are not the essence of the present invention, these parameters may be calculated in arbitrary manners.

In step 560, a target lateral acceleration Gyt necessary for causing the vehicle to travel along the target trajectory is calculated based on the parameter of the trajectory control and the like. It should be noted that the target lateral acceleration Gyt may be calculated by a function of the parameter of the trajectory control. Alternatively, a map that indicates the relationship between the parameter of the trajectory control and the target lateral acceleration Gyt may be set, and the target lateral acceleration Gyt may be calculated according to the map based on the parameter of the trajectory control.

Figure 9:
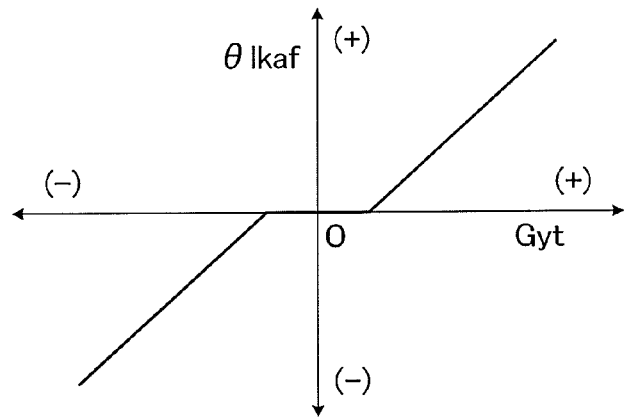
FIG. 9 is a map for calculation of a target rudder angle θlkaf of front wheels for trajectory control based on a target lateral acceleration Gyt of a vehicle.

In step 565, a target rudder angle θlkaf of the front wheels for trajectory control is calculated based on the target lateral acceleration Gyt of the vehicle according to a map illustrated in FIG. 9.

Figure 10:
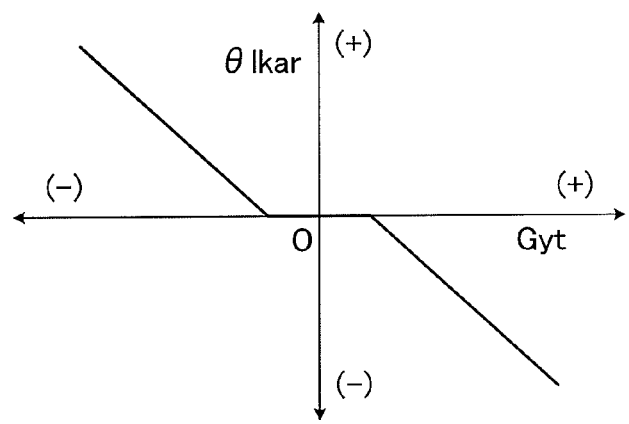
FIG. 10 is a map for calculation of a target rudder angle θlkar of rear wheels for trajectory control based on a target lateral acceleration Gyt of a vehicle.

In step 570, a target rudder angle θlkar of the rear wheels for trajectory control is calculated based on the target lateral acceleration Gyt of the vehicle according to a map illustrated in FIG. 10.

Figure 11:
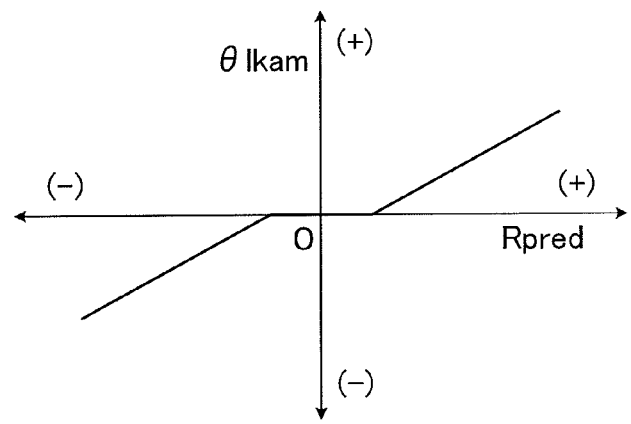
FIG. 11 is a map for calculation of a target rotation angle θlkam of a steering wheel based on a rate of change Rpred of a curvature R of a target trajectory.

In step 575, a rate of change Rpred of a curvature of a traveling road that is ahead for a preliminarily set distance L0 is obtained. At the same time, a correction quantity θlkafm of the target rudder angle θlkaf of the front wheels for trajectory control is calculated based on the rate of change Rpred according to a map illustrated in FIG. 11. It should be noted the distance L0 may be a positive constant, or alternatively, it may be set variably with the vehicle speed V so as to increase as the vehicle speed V increases.

In step 580, a correction quantity θlkafm is added to the target rudder angle θlkaf of the front wheels, whereby a target rudder angle θlkaf of the front wheels, corrected so that trajectory control is executed without a delay to the change of the curvature of the traveling road, is calculated.

In step 655 of the target rudder angle calculation routine for calculating target rudder angles of the front and rear wheels illustrated in FIG. 5, an inclination angle αroad of the traveling road is read in, the inclination angle αroad being calculated in step 1450 of a roll angle control routine for controlling the roll angle of the vehicle body illustrated in FIG. 8, which is to be described below.

In step 660, a target inclination angle αbtg_pa of the vehicle body after processing by a phase advancement filter is read in, the target inclination angle αbtg_pa being calculated in step 1600 of the roll angle control routine for controlling the roll angle of the vehicle body illustrated in FIG. 8.

In step 665, an inclination angle of the vehicle body with respect to the traveling road, that is, a difference αroad−αbtg_pa between the inclination angle αroad of the traveling road and the target inclination angle αbtg_pa of the vehicle body, is calculated as a relative inclination angle αre of the vehicle body.

Figure 12:
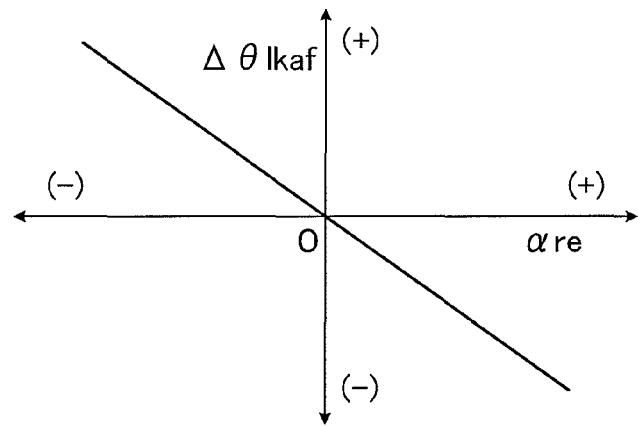
FIG. 12 is a map for calculation of a correction quantity Δθlkaf for a target rudder angle of front wheels for avoiding influences of roll steer of the front wheels based on a relative inclination angle are of a vehicle body.

In step 670, a correction quantity Δθlkaf for the target rudder angle of the front wheels for eliminating influences of roll steer of the front wheels is calculated based on the relative inclination angle αre of the vehicle body according to a map illustrated in FIG. 12.

Figure 13:
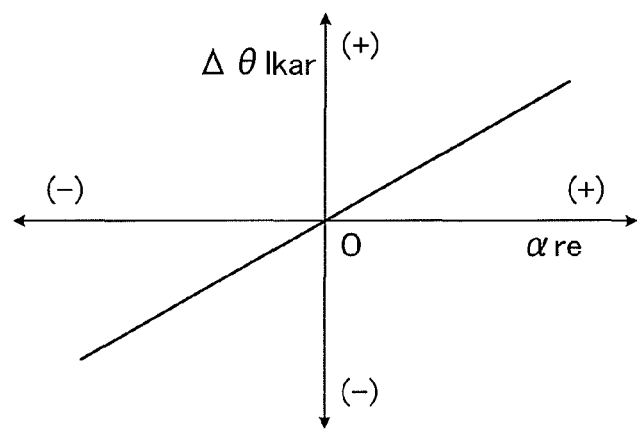
FIG. 13 is a map for calculation of a correction quantity Δθlkar for a target rudder angle of rear wheels for avoiding influences of roll steer of the rear wheels based on a relative inclination angle are of a vehicle body.

In step 675, a correction quantity Δθlkar for the target rudder angle of the rear wheels for eliminating influences of roll steer of the rear wheels is calculated based on the relative inclination angle αre of the vehicle body according to a map illustrated in FIG. 13.

<Assist Torque Control Routine>

Figure 6:
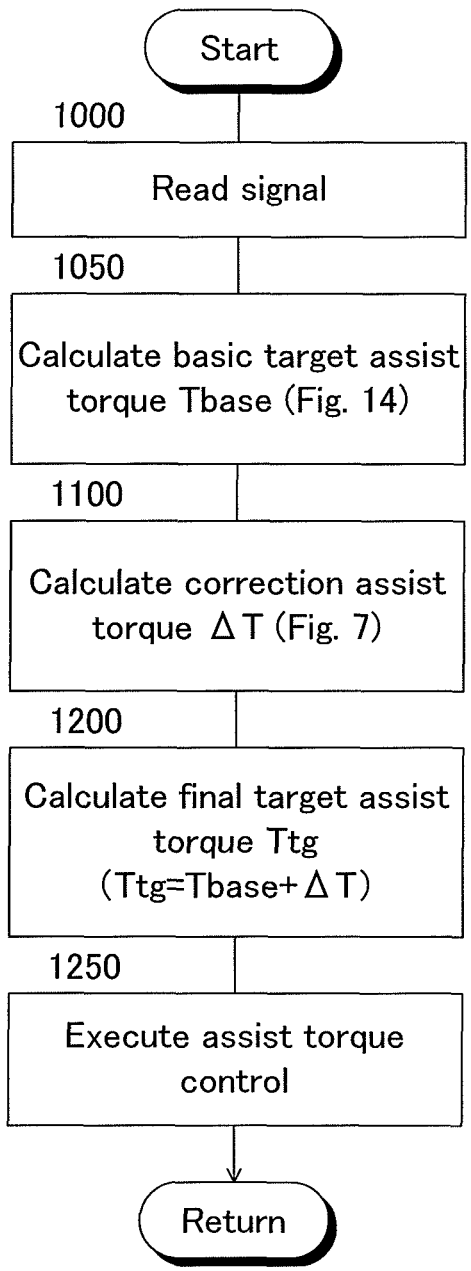
FIG. 6 is a flowchart illustrating an assist torque control routine in First to Third Embodiments.
Figure 7:
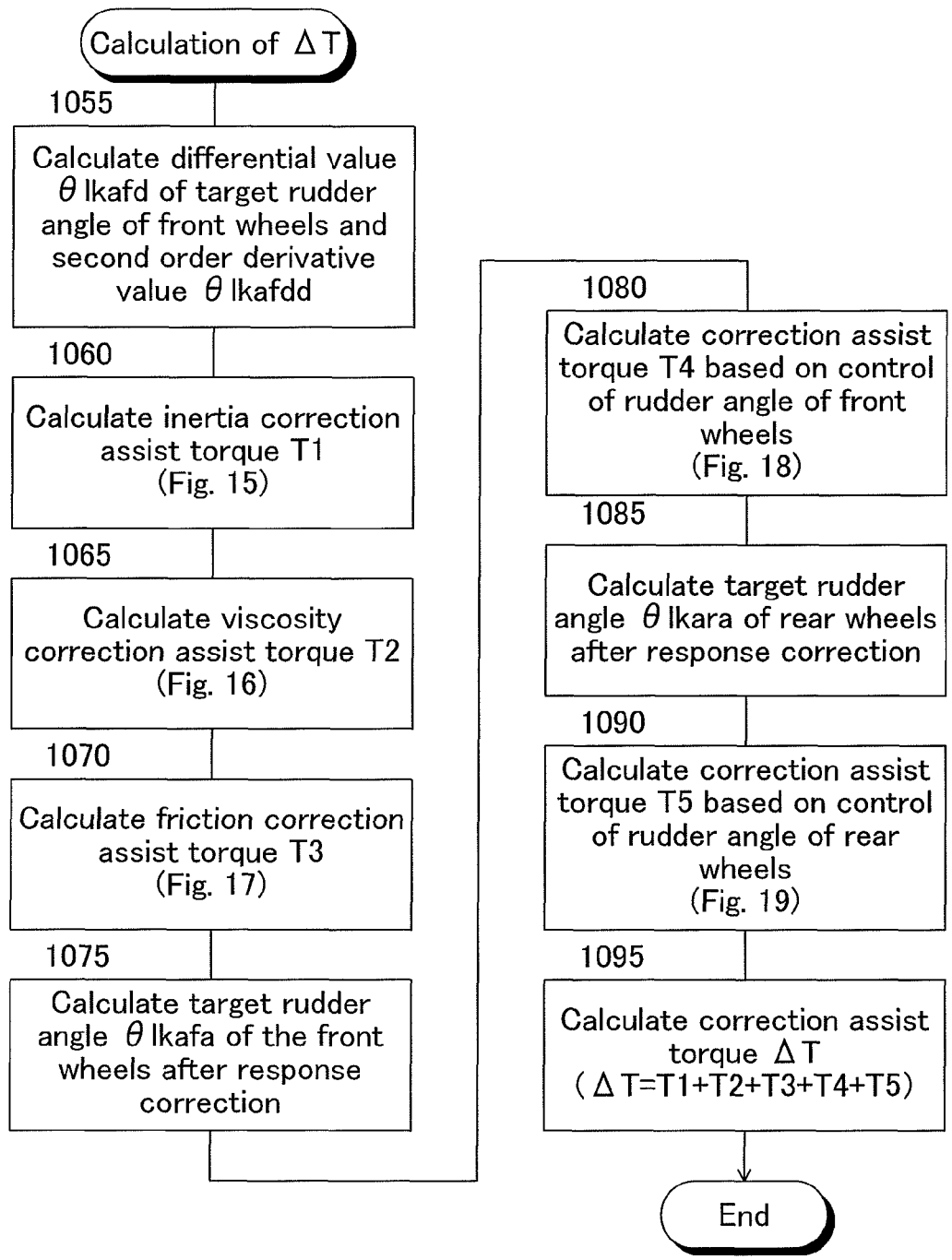
FIG. 7 is a flowchart illustrating a correction assist torque calculation routine executed in step 1100 in the flowchart illustrated in FIG. 6.

Next, referring to the flowcharts illustrated in FIGS. 6 and 7, the following describes an assist torque control routine achieved by the EPS control unit of the electronic control device 16.

Figure 14:
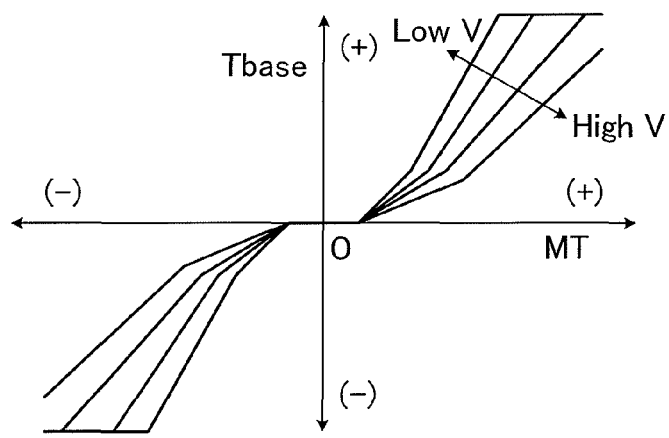
FIG. 14 is a map for calculation of a basic target assist torque Tbase for reducing steering loads based on a steering torque MT and a vehicle speed V.

First, in step 1000, a signal indicating the steering torque MT and the like are read in, and in step 1050, a basic target assist torque Tbase for reducing steering loads is calculated based on the steering torque MT and the vehicle speed V according to a map illustrated in FIG. 14.

In step 1100, as is described in detail below, a correction assist torque ΔT for appropriately executing assist torque control is calculated, according to the flowchart illustrated in FIG. 7.

In step 1200, a sum of the basic target assist torque Tbase and the correction assist torque ΔT is calculated as a final target assist torque Ttg.

In step 1250, the electric power steering device 22 is controlled based on the final target assist torque Ttg, whereby an assist torque generated by the electric power steering device 22 is controlled so as to coincide with the final target assist torque Ttg.

In step 1055 of the correction assist torque calculation routine illustrated in FIG. 7, a differential value θlkafd and a second order derivative value θlkafdd of a final target rudder angle θlkaf of the front wheels, that is, a differential value θlkafd of a target rudder angle θlkaf of the front wheels after correction calculated in step 380 described above, are calculated.

Figure 15:
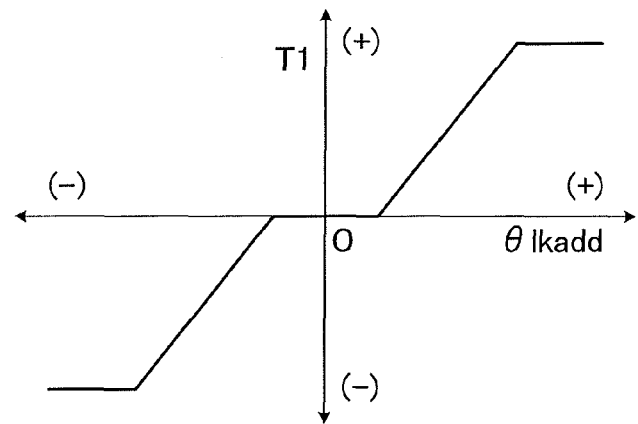
FIG. 15 is a map for calculation of an inertia correction assist torque T1 for compensating inertia of a steering system and an electric power steering device based on a second order derivative value θlkafdd of a final target rudder angle θlkaf of front wheels.

In step 1060, an inertia correction assist torque T1 for compensating inertia of a steering system and the electric power steering device 22 are calculated based on the second order derivative value θlkafdd of the final target rudder angle θlkaf of the front wheels according to a map illustrated in FIG. 15.

Figure 16:
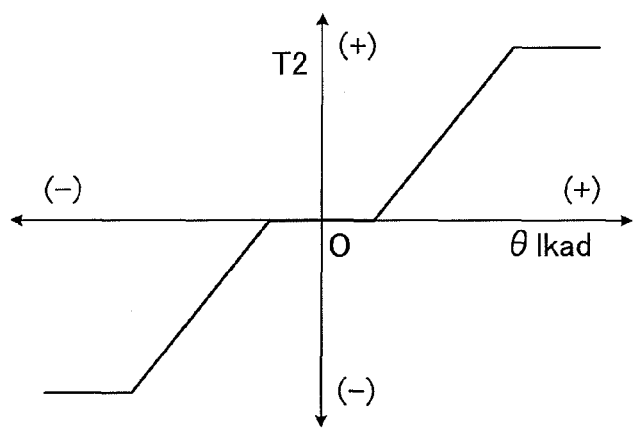
FIG. 16 is a map for calculation of a viscosity correction assist torque T2 for compensating a viscosity of a steering system and an electric power steering device based on a differential value θlkafd of a final target rudder angle θlkaf of front wheels.

In step 1065, a viscosity correction assist torque T2 for compensating a viscosity of the steering system and the electric power steering device 22 is calculated based on the differential value θlkafd of the final target rudder angle θlkaf of the front wheels according to a map illustrated in FIG. 16.

Figure 17:
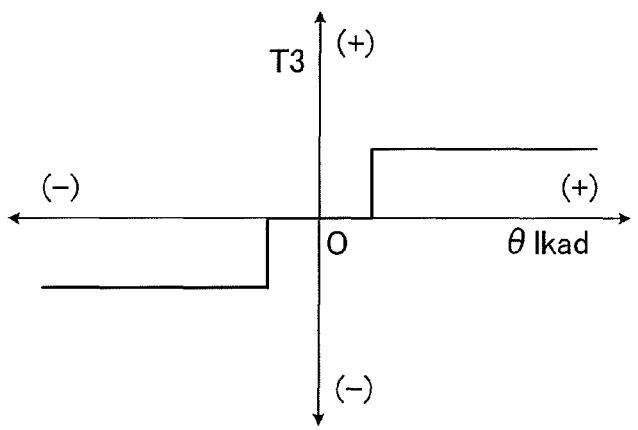
FIG. 17 is a map for calculation of a friction correction assist torque T3 for compensating a friction of a steering system and an electric power steering device based on a differential value θlkafd of a final target rudder angle θlkaf of front wheels.

In step 1070, a friction correction assist torque T3 for compensating a friction of the steering system and the electric power steering device 22 is calculated based on a differential value θlkafd of the final target rudder angle θlkaf of the front wheels according to a map illustrated in FIG. 17.

In step 1075, the final target rudder angle θlkaf of the front wheels is processed by, for example, a secondary-delay and secondary-advance filter, a target rudder angle θlkafa of the front wheels after response correction, that is, a target rudder angle of the front wheels that is corrected regarding responsiveness of the steering torque with respect to a change of the rudder angle of the front wheels, is calculated.

Figure 18:
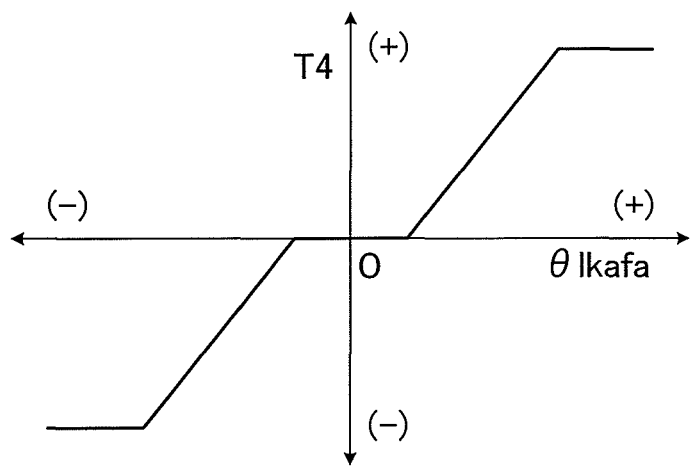
FIG. 18 is a map for calculation of a correction assist torque T4 based on control of a rudder angle of the front wheels, based on a target rudder angle θlkafa of the front wheels after response correction.

In step 1080, a correction assist torque T4 based on control of the rudder angle of the front wheels is calculated based on the target rudder angle θlkafa of the front wheels after response correction according to a map illustrated in FIG. 18. It should be noted that the correction assist torque T4 is an assist torque for assisting control of the rudder angle of the front wheels for trajectory control such that the rudder angle of the front wheels should coincide with the target rudder angle θlkafa.

In step 1085, the target rudder angle θlkar of the rear wheels are processed by, for example, secondary-delay and secondary-advanced filters, a target rudder angle θlkara of the rear wheels after response correction, that is, a target rudder angle of the rear wheels that is corrected regarding responsiveness of the steering torque with respect to a change of the rudder angle of the rear wheels, is calculated.

Figure 19:
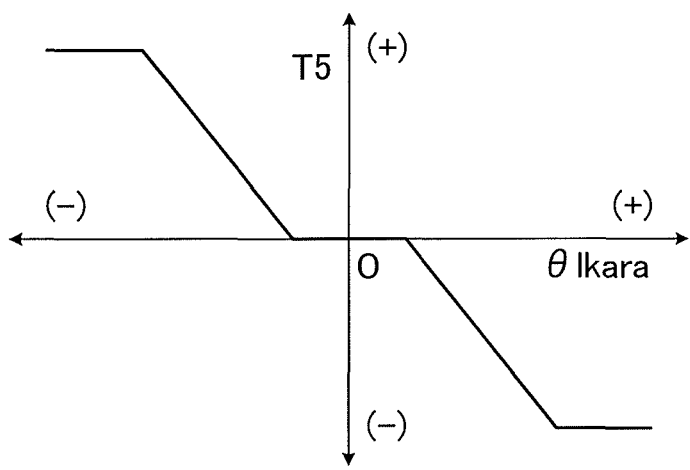
FIG. 19 is a map for calculation of a correction assist torque T5 based on control of a rudder angle of the rear wheels, based on a target rudder angle θlkara of the rear wheels after response correction.

In step 1090, a correction assist torque T5 based on control of the rudder angle of the rear wheels is calculated based on the target rudder angle θlkara of the rear wheels after response correction according to a map illustrated in FIG. 19. It should be noted that the correction assist torque T5 is a correction assist torque for compensating a change of the steering torque due to control of the rudder angle of the rear wheels such that the rudder angle of the rear wheels should coincide with the target rudder angle θlkara.

In step 1095, a sum of the correction assist torques T1 to T5 calculated in steps 1060 to 1070, 1080, and 1090 is calculated as a correction assist torque ΔT.

<Roll Angle Control Routine for Controlling Roll Angle of Vehicle Body>

Next, referring to flowchart illustrated in FIG. 8, the following describes a roll angle control routine for controlling a roll angle of the vehicle body, which is achieved by the active stabilizer control unit of the electronic control device 16 for controlling the active stabilizers 56 and 58.

First, in step 1300, a signal indicating a roll rate ωr and the like are read in. In the next step 1350, it is determined whether an instruction for executing roll angle control for controlling a roll angle of the vehicle body is output by the cruise control unit of the electronic control device 16, based on which it is determined whether vehicle body roll angle control is necessary. When the result of the determination is negative, the control returns to step 1300, and when the result of the determination is affirmative, the control proceeds to step 1400.

In step 1400, an integral value ωrint of the roll rate ωr of the vehicle from when the vehicle started traveling until the present time is calculated, and an absolute roll angle αab of the vehicle body is calculated as a sum of the integral value ωrint and an initial value α0 of the roll angle of the vehicle body. The initial value α0 of the roll angle of the vehicle body is a roll angle when the vehicle started traveling, and the absolute roll angle αab is a current roll angle of the vehicle body in the absolute space.

In step 1450, the roll angle αref of the vehicle body on the front wheel side with respect to the traveling road based on strokes HFL and HFR at positions of the left and right front wheels is calculated. Further, the roll angle αrer of the vehicle body on the rear wheel side with respect to the traveling road based on strokes HRL and HRR at positions of the left and right rear wheels is calculated. Then, a mean value of the roll angles αref and αrer is calculated, which is considered as a relative roll angle αre of the vehicle body, that is, a roll angle of the vehicle body with respect to the traveling road.

In step 1500, a difference αab−αre between the absolute roll angle αab of the vehicle body and the relative roll angle αre of the vehicle body is calculated as an inclination angle αroad of the traveling road in the absolute space. It should be noted that the roll angle and the inclination angle of the traveling road have positive values in the case of being inclined downward to the right side.

In step 1550, a product of a coefficient K that is greater than 0 and smaller than 1 and the inclination angle αroad of the traveling road is calculated as the target inclination angle αbtg of the vehicle body, that is, a target lateral-direction inclination angle of the vehicle body in the absolute space. It should be noted that the coefficient K is preferably a value equal to or more than 0.2 and equal to or less than 0.8; and particularly preferably the lower limit value thereof is equal to or more than 0.3, and the upper limit value thereof is equal to or less than 0.7. Further, the coefficient K may be constant, but alternatively, the coefficient K may be set to be variable with the vehicle speed V so as to, for example, be smaller as the vehicle speed V is higher.

In step 1600, the target inclination angle αbtg of the vehicle body is processed by the phase advancement filter, whereby a target inclination angle αbtg_pa of the vehicle body after the processing by the phase advancement filter is calculated.

In step 1650, the difference αroad−αbtg_pa between the inclination angle αroad of the traveling road and the target inclination angle αbtg_pa of the vehicle body is calculated as a target roll angle αbrtg of the vehicle body.

In step 1700, front wheel side and rear wheel side target anti-roll moments Mtgf and Mtgr for causing the inclination angle of the vehicle body to coincide with the target inclination angle is calculated, based on the target roll angle αbrtg of the vehicle body, according to the expressions (17) and (18) below corresponding to the above-described expressions (9) and (10), respectively:

$$Mtgf = \frac{Tf^2 Kf}{2} \alpha brtg \quad (17)$$

$$Mtgr = \frac{Tr^2 Kr}{2} \alpha brtg \quad (18)$$

In step 1900, target actuator torques Ttgf and Ttgr of the front wheel side and rear wheel side actuators 58F and 58R are calculated based on the target anti-roll moments Mtgf and Mtgr, according to the expressions (19) and (20) below corresponding to the above-described expressions (15) and (16), respectively:

$$Ttgf = \frac{Lsf}{TfRsaf} Mtgf \quad (19)$$

$$Ttgr = \frac{Lsr}{TrRsar} Mtgr \quad (20)$$

In step 1950, target rotation angles ψtgf and ψtgr of the actuators 58F and 58R for causing output torques of the front wheel side and rear wheel side actuators 58F and 58R to coincide with the target actuator torque Ttgf and Ttgr are calculated. It should be noted that the target rotation angles may be calculated according to, for example, a map that is not illustrated in the drawings, or alternatively, may be calculated according to preliminarily obtained expressions.

In step 2000, the actuators 58F and 58R are controlled so that the rotation angles of the actuators 58F and 58R should coincide with the target rotation angles ψtgf and ψtgr, respectively, whereby the inclination angle of the vehicle body is controlled so as to coincide with the target inclination angle αbtg.

<Relationship Between Claimed Ranges and Configuration>

As is clear from the foregoing description, the active stabilizer devices 56 and 58, as well as the active stabilizer control unit of the electronic control device 16, which controls the active stabilizer devices 56 and 58 according to the flowchart illustrated in FIG. 8 constitute an exemplary "roll control device". Further, the roll rate sensor 72 and the stroke sensor 74i, as well as the cruise control unit of the electronic control device 16, which calculates and determines various inclination angles according to the flowcharts illustrated in FIGS. 3 and 8 based on detection values of the roll rate sensor 72 and the stroke sensor 74i, constitute an exemplary "inclination determination device". Still further, the rudder angle varying device 14 and the rear wheel steering device 42, as well as the cruise control unit of the electronic control device 16, which controls the rudder angle varying device 14 and the rear wheel steering device 42 according to the flowcharts illustrated in FIGS. 3 to 5 constitute an exemplary "cruise control device". The cruise control device performs trajectory control for causing a vehicle to travel along a target trajectory by steering wheels, in cooperation with the roll control device, the inclination determination device, and the electric power steering device 22 controlled by the electric power steering device control unit of the electronic control device 16.

<Operation of First Embodiment>

Next, the following describes trajectory control and roll angle control by the cruise control device of First Embodiment, regarding various driving situations of a vehicle.

(A) When the selection switch 70 is OFF or normal trajectory control is inexecutable:

In steps 150 and 200, the results of the determinations are negative. Therefore, trajectory control is not executed, and further, roll angle control is not executed, either, irrespective of whether the traveling road is a laterally inclined road.

(B) When the selection switch 70 is ON and normal trajectory control is executable:

(B-1) When the traveling road is not a laterally inclined road:

In step 150, the result of the determination is affirmative, and in step 250, the result of the determination is negative. Then, in steps 300 and 350, the result of the determination is negative, and step 450 is not executed, whereas step 500 is executed. Therefore, only trajectory control is executed, and roll angle control is not executed.

(B-2) When the traveling road is a laterally inclined road:

In step 150, the result of the determination is affirmative, and in step 250, the result of the determination is negative. Then, in step 300, the result of the determination is affirmative, and steps 450 and 500 are executed. Therefore, both of trajectory control and roll angle control are executed.

(C) When the selection switch 70 is switched from OFF to ON, or when normal trajectory control changes from being inexecutable to being executable:

(C-1) When the traveling road is not a laterally inclined road:

In step 150, the result of the determination is negative, but in step 200, the result of the determination is affirmative. Then, in steps 300 and 350, the results of the determinations are negative, and step 450 is not executed, whereas step 500 is executed. Therefore, only trajectory control is started, and roll angle control is not started. This causes the situation of control to change from (A) described above to (B-1) described above.

(C-2) When the traveling road is a laterally inclined road:

In this case as well, in step 150, the result of the determination is negative, and in step 200, the result of the determination is affirmative. In step 300, however, the result of the determination is affirmative, and steps 450 and 500 are executed. Therefore, both of trajectory control and roll angle control are simultaneously started, and the situation of control changes from (A) described above to (B-2) described above.

(D) When the selection switch 70 is switched from ON to OFF, or when normal trajectory control changes from being executable to being inexecutable:

(D-1) When the traveling road is not a laterally inclined road:

In step 150 and 250, the results of the determinations are affirmative, but in step 800, the result of the determination is negative, and step 900 is executed. Therefore, only trajectory control is ended, and roll angle control is maintained in the situation of being inexecutable. This causes the situation of control to change from (B-1) described above to (A) described above.

(D-2) When the traveling road is a laterally inclined road:

In steps 150, 250, and 800, the results of the determinations are affirmative, and steps 850 and 900 are executed. Therefore, both of trajectory control and roll angle control are simultaneously ended, and the situation of control changes from (B-2) described above to (A) described above.

<Difference between Presence/Absence of Trajectory Control and Roll Angle Control>

Next, referring to FIGS. 20 to 23, the following describes the inclination of the vehicle body, the rotation position of the steering wheel, and the rudder angle of the front wheels when the vehicle is going straight on a laterally inclined road, regarding various situations of trajectory control and roll angle control.

It should be noted that, in FIGS. 20 to 23, "110" indicates the horizontal direction in the absolute space, and "112" indicates the vertical direction of the vehicle 12. Further, in FIGS. 20 to 23, the upper parts are views obtained when the vehicle is viewed from the back side, the middle parts are views obtained when the steering wheel is viewed in a direction along the rotation axis thereof, and the lower parts are views obtained when the vehicle is viewed from the top side.

Figure 20:
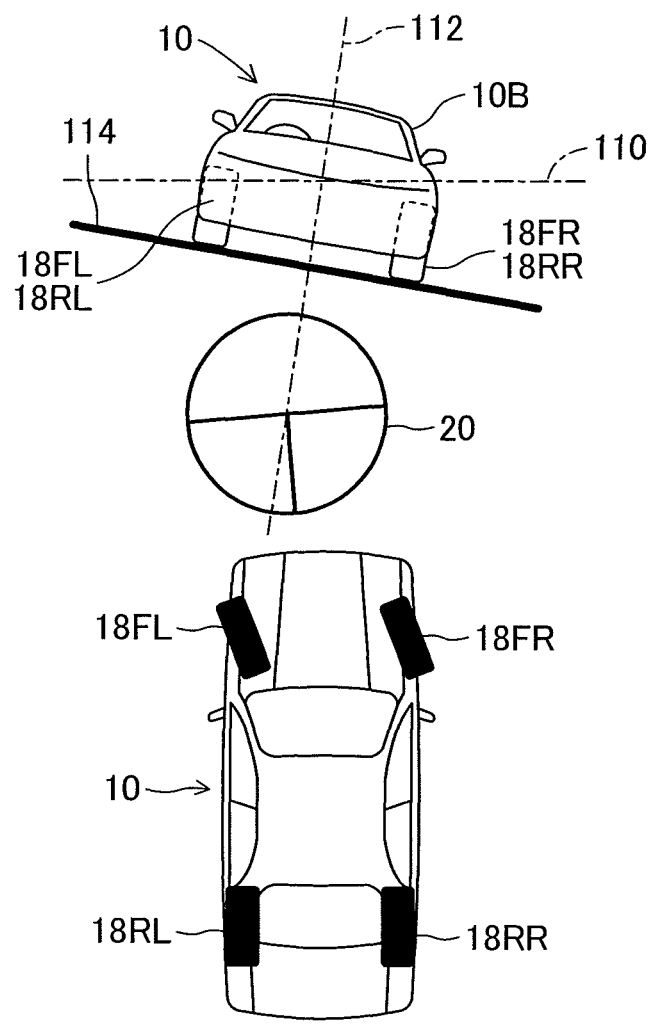
FIG. 20 explains an inclination of a vehicle body, a rotation position of a steering wheel, and a rudder angle of the front wheels when a vehicle goes straight on a laterally inclined road, in the case where trajectory control and roll angle control are not executed.
Figure 21:
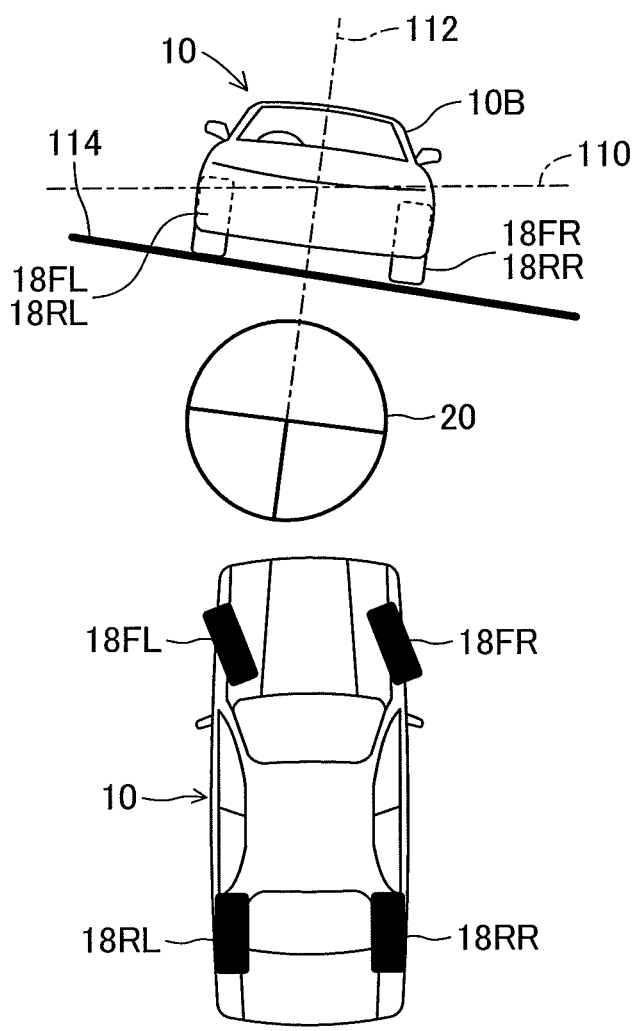
FIG. 21 explains an inclination of a vehicle body, a rotation position of a steering wheel, and a rudder angle of the front wheels when a vehicle goes straight on a laterally inclined road, in the case where trajectory control is executed and roll angle control is not executed.
Figure 22:
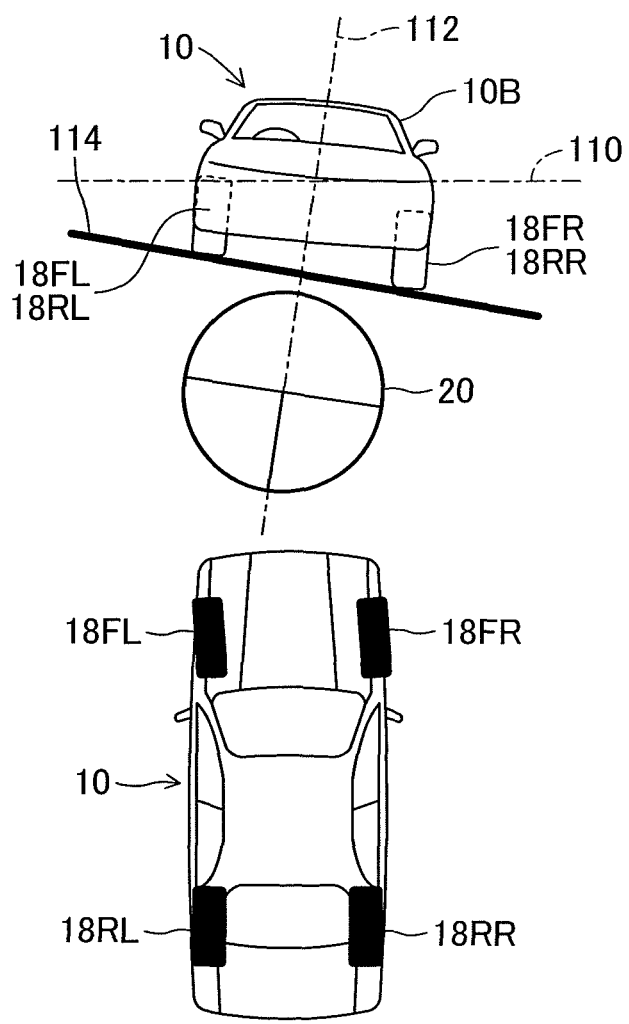
FIG. 22 explains an inclination of a vehicle body, a rotation position of a steering wheel, and a rudder angle of the front wheels when a vehicle goes straight on a laterally inclined road, in the case where trajectory control and roll angle control are executed.
Figure 23:
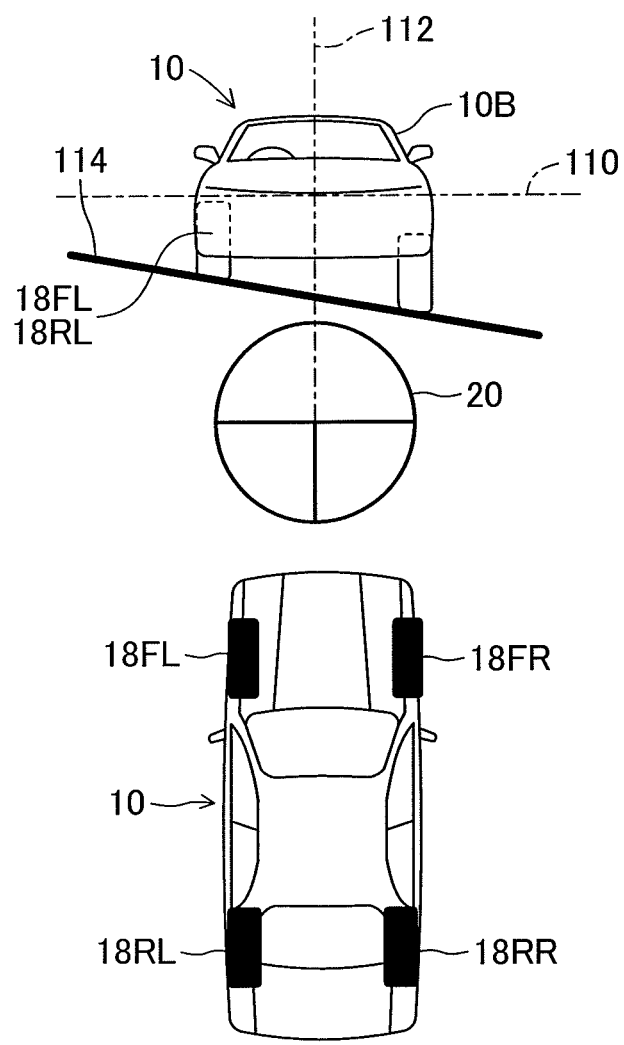
FIG. 23 explains an inclination of a vehicle body, a rotation position of a steering wheel, and a rudder angle of the front wheels when a vehicle goes straight on a laterally inclined road, in the case where roll angle control that is so excessive that the vehicle body has a roll angle of 0 is executed.

(I) When trajectory control and roll angle control are not executed (FIG. 20)

Since a vehicle-lateral-direction component of gravity that works on the vehicle body 12B of the vehicle 12 generates a roll moment, the vehicle body 12B inclines to the downward of the traveling road relatively with respect to the traveling road 114. Therefore, the inclination angle of the vehicle body 12B becomes greater than the inclination angle of the traveling road 114, which causes the wheels to be in the following state: the wheels 18FR and 18RR positioned on the lower side of the traveling road bound, and the wheels 18FL and 18RL positioned on the higher side of the traveling road rebound. Further, an occupant in the vehicle is in the following state: he/she is inclined by an angle in the vertical direction toward the lower side of the traveling road, the angle being substantially identical to the inclination angle of the vehicle body 12B.

Further, a component of the gravity working on the vehicle body 12B along the road surface of the traveling road works toward the lower side of the traveling road, which energizes the vehicle toward the lower side of the traveling road. Therefore, in order for the vehicle to go straight, the front wheels 18FR and 18FL have to be turned toward the higher side of the traveling road so that a lateral force that counters the component along the road surface of the traveling road should be generated. Therefore, the steering wheel 20 is steered toward the higher side of the traveling road. Further, a steering-keeping torque for maintaining a state in which the steering wheel 20 is steered toward the higher side of the traveling road is needed.

(II) When trajectory control is executed and roll angle control is not executed (FIG. 21):

As is the case with (I) described above, the vehicle body 12B is inclined relatively with respect to the traveling road 114, toward the lower side of the traveling road, and the occupant of the vehicle is in a state of being inclined by an angle in the vertical direction toward the lower side of the traveling road, the angle being substantially identical to the inclination angle of the vehicle body 12B.

Additionally, the front wheels 18FR and 18FL are turned toward the higher side of the traveling road by automatic steering of trajectory control so that a lateral force that counters the component along the road surface of the traveling road should be generated. As the vehicle goes straight, the steering wheel 20 is in a straight traveling position, and a steering-keeping torque is substantially unnecessary.

When the trajectory of the vehicle is a target trajectory for going straight, the control quantity of trajectory control becomes 0, and the rudder angle of the front wheels is reduced. Then, the vehicle is energized toward the lower side of the traveling road and the cruise trajectory is deviated from the target trajectory, which results in that the rudder angle of the front wheels toward the higher side of the traveling road is increased by automatic steering of trajectory control. Therefore, the vehicle tends to meander while traveling.

Further, since the range of the steering of the front wheels 18FR and 18FL by trajectory control is limited, in the case where the inclination angle of the traveling road 114 is great and a gravity component along the road surface of the traveling road is great, the steering angle of the front wheels by trajectory control is insufficient, and the vehicle becomes unable to go straight along the target trajectory in some cases.

(III) When trajectory control and roll angle control are executed (FIG. 22):

This is a case of First Embodiment. Roll angle control causes the inclination angle of the vehicle body 12B to have a median value between the inclination angle of the traveling road 114 and 0 (no inclination). Therefore, in contrast to the case illustrated in FIGS. 20 and 21, the wheels in the following state: the wheels 18FR and 18RR on the lower side of the traveling road rebound, and the wheels 18FL and 18RL on the higher side of the traveling road bound.

As a result, the vehicle-lateral-direction component of gravity that works on the vehicle body 12B and a component of gravity along the road surface of the traveling road are smaller than those in the cases of (I) and (II) described above, and therefore, an angle for which the front wheels 18FR and 18FL are turned toward the higher side of the traveling road by automatic steering of trajectory control is small.

Further, when the trajectory of the vehicle is a target trajectory for going straight, the control quantity of trajectory control becomes 0, and the rudder angle of the front wheels is reduced. But the force with which the vehicle is energized toward the lower side of the traveling road is small, and therefore, the correction quantity for the rudder angle of the front wheels by cruise trajectory is small as compared with the case of (II) described above. Therefore, the vehicle goes straight while traveling, substantially without meandering.

Further, as is the case with (II) described above, the front wheels 18FR and 18FL are turned by automatic steering of trajectory control, and the vehicle goes straight. As a result, the steering wheel 20 is in the straight traveling position, and a steering-keeping torque is substantially unnecessary.

Further, as the inclination angle of the vehicle body 12B is smaller than those in the cases of (I) and (II) described above, the angle in the vertical direction for which the occupant of the vehicle is inclined toward the lower side of the traveling road is smaller than those in the cases of (I) and (II) described above.

(IV) When excessive roll angle control is executed (FIG. 23):

In the case where, by execution of excessive roll angle control, the inclination angle of the vehicle body 12B is controlled to 0, irrespective of the magnitude of the inclination angle of the traveling road, and when the attitude of the vehicle body is controlled so as to become horizontal, the vehicle-lateral-direction component of gravity that works on the vehicle body 12B and the component of gravity along the road surface of the traveling road become 0.

Therefore, except for the point that the wheels 18FR and 18RR on the lower side of the traveling road rebound and the wheels 18FL and 18RL on the higher side of the traveling road bound, the traveling state of the vehicle is identical to that in the case of going straight on a horizontal road. In other words, the rudder angle of the front wheels 18FR and 18FL becomes 0, the steering wheel 20 is in the straight traveling position, and a steering-keeping torque is unnecessary. Further, the angle in the vertical direction for which the occupant of the vehicle is inclined becomes 0 as well.

It should be noted that, as the rudder angle of the front wheels is 0, the control quantity for the same is 0 as well when trajectory control is executed. Therefore, in the case where the inclination angle of the vehicle body is controlled so as to become 0 by roll angle control, the driving situation of the vehicle does not vary depending on whether trajectory control is executed or not, as long as the steering wheel 20 is in the straight traveling position.

(V) When roll control based on lateral acceleration of the vehicle is executed:

Roll control for controlling an anti-roll moment based on a detection value or estimation value of lateral acceleration of the vehicle in order to reduce rolling upon turning of the vehicle has been known already. A lateral force, however, that works on the vehicle body when the vehicle travels on a laterally inclined road is smaller than a lateral force that works on the vehicle body when the vehicle sharply turns. Therefore, even if conventional roll control based on lateral acceleration of the vehicle is executed when the vehicle travels on a laterally inclined road, the inclination angle of the vehicle body is not smaller than the inclination angle of the traveling road, though it is smaller as compared with roll control is not executed.

Therefore, the inclination angle of the vehicle body, the rotation angle of the steering wheel 20, and the inclination angle in the vertical direction of the occupant in the absolute space are smaller than those in the case of (I) described above, respectively, but are not as small as those in the case of (III) described above, respectively.

It should be noted that (I) to (V) described above describe cases where the vehicle goes straight on a laterally inclined road, but in the case where, for example, the vehicle turns on a laterally inclined road, the relationship between the cases regarding the inclination angle of the vehicle body and the like is identical to those described above, though the values of the inclination angle of the vehicle body and the like are different from those of the case where the vehicle goes straight.

<Effects of First Embodiment>

As is clear from what is described above, according to First Embodiment, in the case where trajectory control is executed in a situation where the vehicle travels on a laterally inclined road, the driving situation of the vehicle is controlled so as to be the situation of (III) described above. Therefore, as is clear from comparison between the cases of (I) and (III) described above, the driver can surely recognize that trajectory control is executed, from the difference of the rotation position of the steering wheel 20. Further, as is clear from comparison between the cases of (I) and (III) described above, since the rotation angle of the steering wheel 20 and the inclination angle in the vertical direction of the occupant in the absolute space are small, the discomfort that the occupant feels when the vehicle travels on a laterally inclined road can be reduced.

Further, according to First Embodiment, since the inclination angle of the vehicle body is never controlled to 0, it is possible to effectively avoid a situation in which, as is the case with (IV), it is impossible to determine whether trajectory control is executed or not, which is caused by the absence of a lateral force working on the vehicle body.

Still further, according to First Embodiment, in the case where trajectory control is started in a situation in which the vehicle travels on a laterally inclined road, roll angle control is simultaneously started as well. Therefore, the driving situation of the vehicle, does not changes from the situation of (I) described above to the situation of (II) described above, but changes from the situation of (I) to the situation of (III) described above. Therefore, the rotation angle of the steering wheel 20 and the changing rate thereof can be reduced. As a result, when trajectory control is started in a situation in which the vehicle travels on a laterally inclined road, discomfort that the occupant feels due to a rotation of the steering wheel can be reduced.

Still further, according to First Embodiment, the inclination angle of the vehicle body is reduced, the lateral force working on the vehicle body, which is caused by the inclination of the vehicle body, can be reduce. Therefore, when trajectory control is started in a situation in which the vehicle travels on a laterally inclined road, trajectory of the vehicle coincides with a target trajectory, and the control quantity for the trajectory control is reduced. As a result, even if the rudder angle of the wheels is reduced, the move of the vehicle toward the lower side of the inclination due to the lateral force can be reduced. Therefore, this makes it possible to surely reduce the risk of the meandering of the vehicle that is caused by increase/decrease of the rudder angle of the wheels caused by increase/decrease of the control quantity for trajectory control.

Further, according to First Embodiment, in the case where trajectory control is ended in a situation in which the vehicle travels on a laterally inclined road, roll angle control is simultaneously ended. The driving situation of the vehicle, therefore, changes, not from the situation of (II) to the situation where only roll angle control is executed, but from the situation of (III) to the situation of (I). Accordingly, the angle for which steering wheel 20 has to be rotated in order to turn the front wheel to the higher side of the traveling road, and this makes it possible to effectively cause the occupant to recognize that trajectory control ends in a situation in which the vehicle travels on a laterally inclined road.

It should be noted that each of above-described operation effects is higher as compared with the case where roll angle control is conventional roll control in (V) described above based on the lateral acceleration of the vehicle, that is, the case where a roll angle control quantity in a situation where the vehicle travels on a laterally inclined road is small.

Second Embodiment

Figure 24:
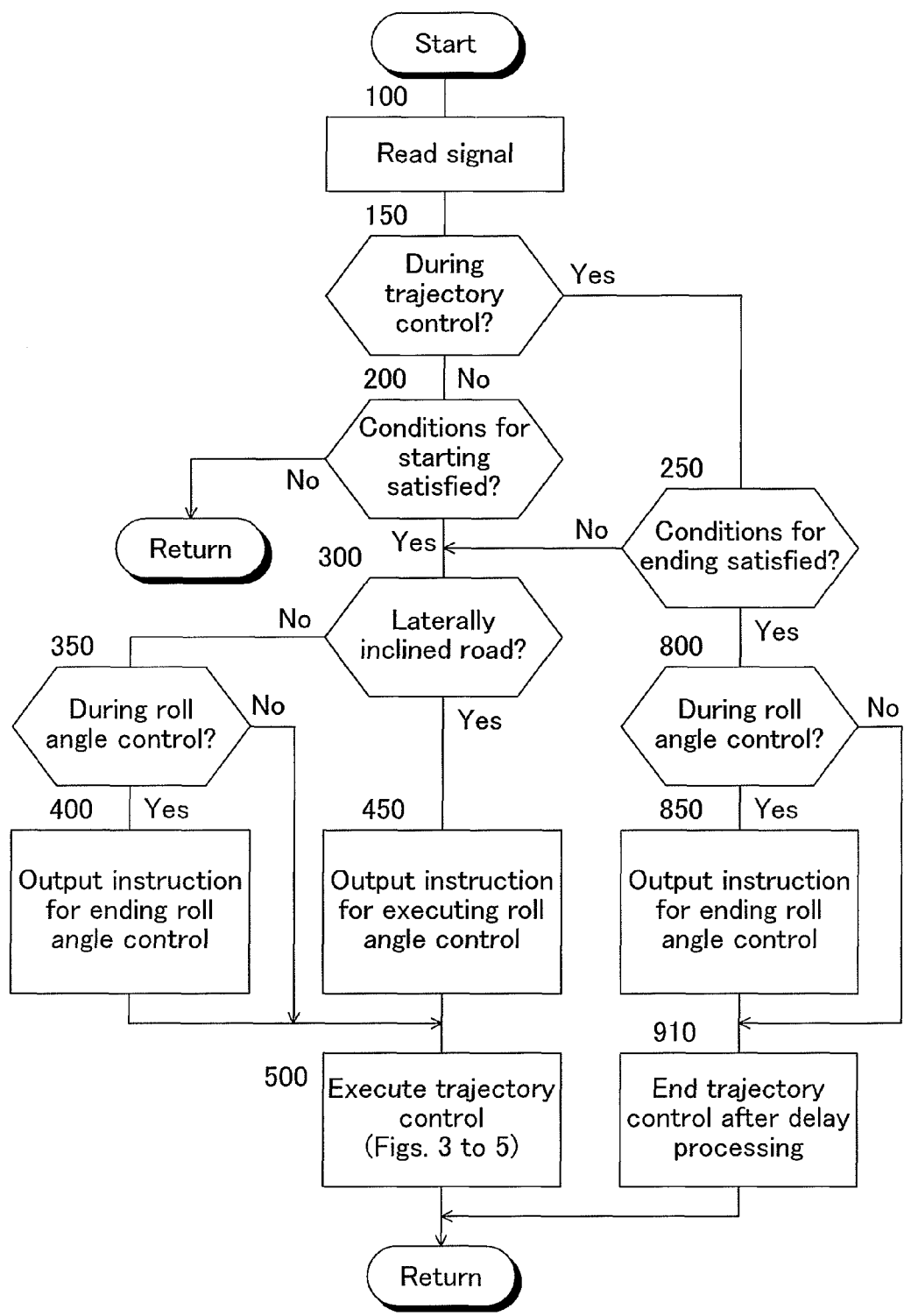
FIG. 24 is a flowchart illustrating a cruise control routine in Second Embodiment of a vehicle cruise control device according to the present invention, configured as a modification example of First Embodiment.

FIG. 24 is a flowchart illustrating a cruise control routine in Second Embodiment of a vehicle cruise control device according to the present invention, configured as a modification example of First Embodiment. It should be noted that the control according to the flowchart illustrated in FIG. 24 is also started by closing of an ignition switch (not illustrated in the drawings), and is repeatedly executed every predetermined time. Further, in FIG. 24, steps identical to the steps illustrated in FIG. 2 are denoted by the same step numbers as those in FIG. 2.

In this Second Embodiment, when conditions for start of trajectory control are satisfied in a situation in which the vehicle travels on a laterally inclined road, trajectory control and vehicle body roll angle control are not simultaneously started, but trajectory control is started with a delay to roll angle control. In other words, in the case where trajectory control is started in a situation in which the vehicle travels on a laterally inclined road, roll angle control is started in advance to the start of trajectory control.

Likewise, when conditions for end of trajectory control are satisfied in a situation in which the vehicle travels on a laterally inclined road, trajectory control and vehicle body roll angle control are not simultaneously ended, but trajectory control is ended with a delay to roll angle control. In other words, in the case where trajectory control is ended in a situation in which the vehicle travels on a laterally inclined road, roll angle control is ended in advance to the end of trajectory control.

Figure 25:
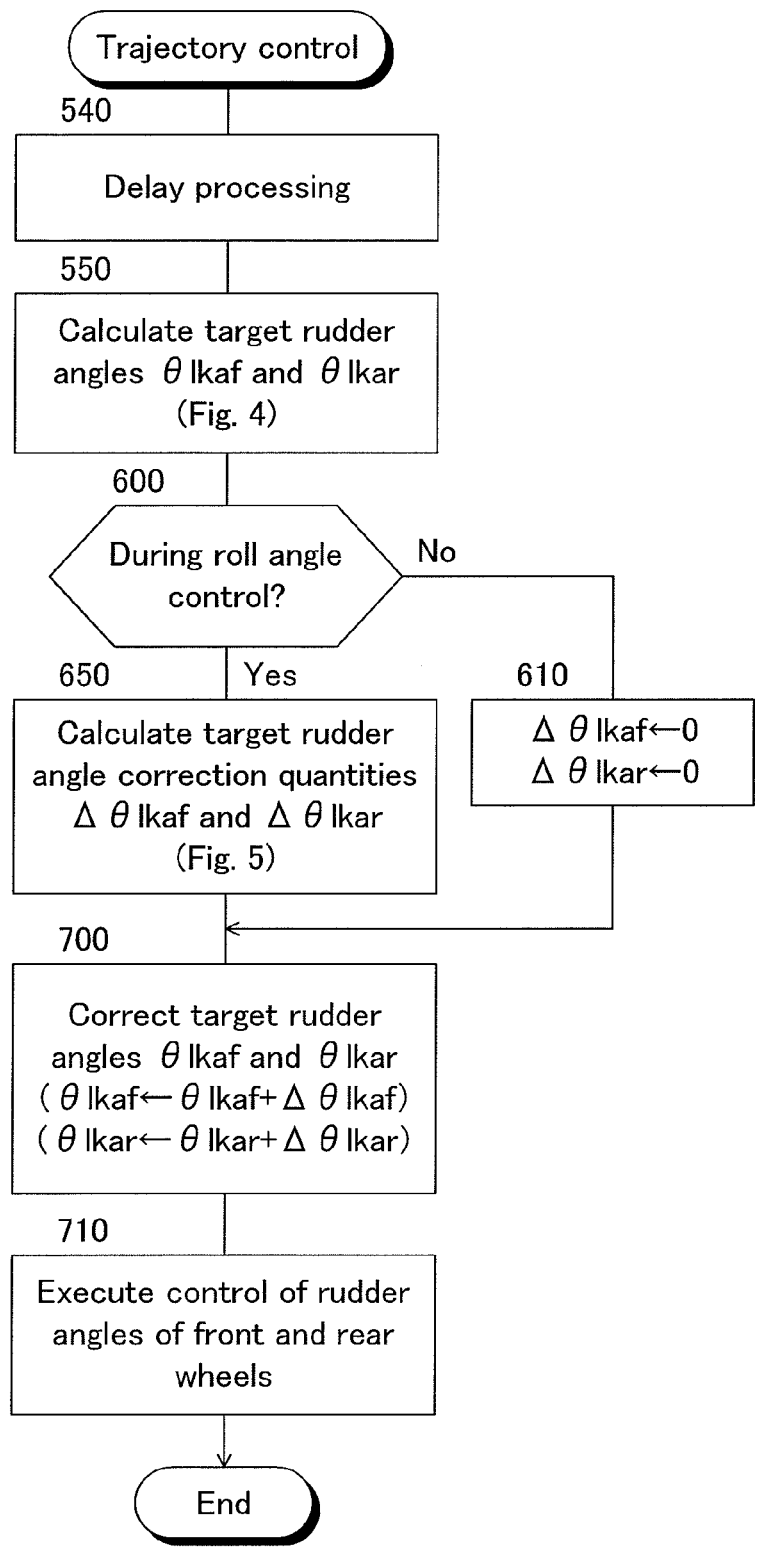
FIG. 25 is a flowchart illustrating a trajectory control routine executed in step 500 in the flowchart illustrated in FIG. 24.

More specifically, trajectory control carried out in step 500 of the cruise control routine illustrated in FIG. 24 is executed according to the flowcharts illustrated in FIGS. 25, 4, and 5. As illustrated in FIG. 25, step 550 is started after a preliminarily set delay time for the start time elapsed by the delay processing in step 540, and the steps after step 550 are executed in the same manners as those in First Embodiment mentioned above, respectively.

Further, step 910 is executed in place of step 900 in First Embodiment, and in step 910, after a preliminarily set delay time for the end time elapsed, trajectory control is ended in the same manner as in step 900.

The steps of cruise control routine other than steps 500 and 910, the steps of assist torque control routine and roll angle control routine for controlling the roll angle of the vehicle body are executed in the same manner as in First Embodiment mentioned above.

In this way, according to Second Embodiment, the same operation effects as those in First Embodiment mentioned above can be achieved. In other words, in the case where trajectory control is executed in a situation in which the vehicle travels on a laterally inclined road, the driver can surely recognize that trajectory control is being executed, and further, discomfort that the occupant feels during the execution of trajectory control or upon the starting or the ending of trajectory control can be reduced.

In particular, according to Second Embodiment, in the case where trajectory control is to be started in a situation in which the vehicle travels on a laterally inclined road, roll angle control can be started in advance to trajectory control. An increase in the control quantity for roll angle control causes an inclination angle of the vehicle body to decrease, thereby causing the lateral force working on the vehicle body to decrease, which allows the driver to recognize that trajectory control is to be started and to gradually decrease the rotation angle of the steering wheel. During this process, trajectory control is started. Therefore, with the execution of trajectory control, the rotation angle during a period until the rotation angle of the steering wheel is returned to 0 becomes smaller, and hence, the rotation speed of the steering wheel may be lower.

Therefore, as compared with the case of First Embodiment in which trajectory control and vehicle body roll angle control are simultaneously started, the occupant is surely allowed to recognize earlier that trajectory control is to be started. Further, discomfort can be reduced that the occupant feels due to changes in the rotation angle of the steering wheel 20 and the meandering of the vehicle, in the case where trajectory control is started in a situation in which the vehicle travels on a laterally inclined road.

Further, according to Second Embodiment, in the case where trajectory control is to be ended in a situation in which the vehicle travels on a laterally inclined road, the ending of the roll angle control can be started in advance to the ending of trajectory control. A decrease in the control quantity for roll angle control causes the inclination angle of the vehicle body to increase, thereby causing the lateral force working on the vehicle body to increase, which allows the driver to recognize that trajectory control is to be ended and to gradually increase the rotation angle of the steering wheel. During this process, trajectory control is ended. Therefore, with the ending of trajectory control, the rotation angle necessary for causing the steering wheel to rotate to the rotation position for causing the vehicle to travel along a desired course becomes smaller, and hence, the rotation speed of the steering wheel may be lower.

Therefore, as compared with the case of First Embodiment in which trajectory control and vehicle body roll angle control are simultaneously ended, the occupant is surely allowed to recognize earlier that trajectory control is to be ended. Further, discomfort can be reduced that the occupant feels in the case where trajectory control is ended in a situation in which the vehicle travels on a laterally inclined road.

It should be noted that according to First and Second Embodiments mentioned above, the lateral-direction inclination angles of the vehicle body and the traveling road are obtained, the target roll angle of the vehicle body is calculated based on these angles, and the roll angle of the vehicle body is controlled so as to coincide with the target roll angle. Therefore, as compared with the case of Third Embodiment, which is described below, in which the roll angle of the vehicle body is controlled based on the lateral force working on the vehicle body, the inclination angle of the vehicle body can be controlled so as to exactly coincide with the desired angle in the case where the vehicle travels on a laterally inclined road, irrespective of a change in the total weight of the vehicle and the like.

Third Embodiment

Figure 26:
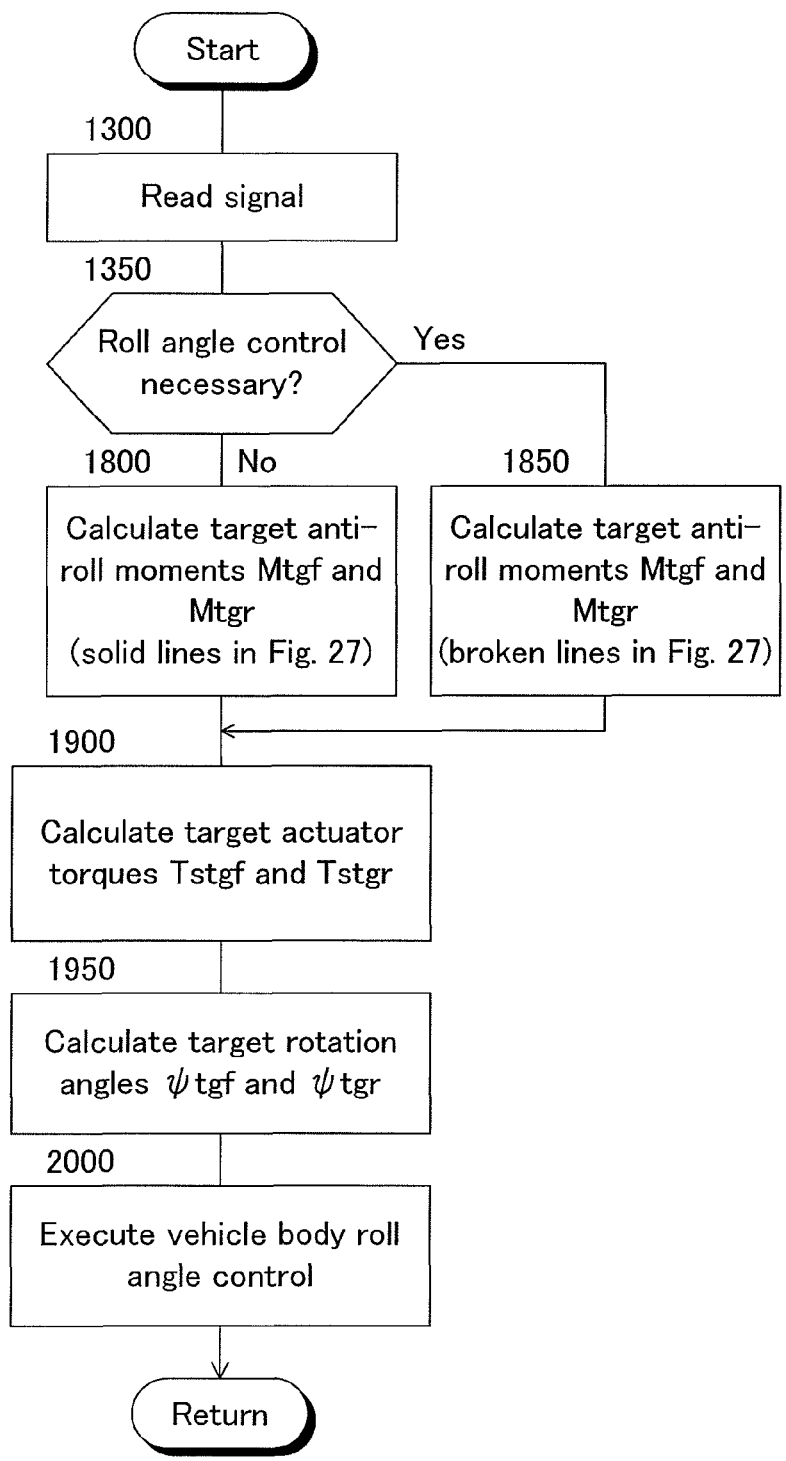
FIG. 26 is a flowchart illustrating a roll angle control routine for controlling a roll angle of a vehicle body in Third Embodiment of a vehicle cruise control device according to the present invention.

FIG. 26 is a flowchart illustrating a roll angle control routine for controlling a roll angle of a vehicle body in Third Embodiment of a vehicle cruise control device according to the present invention. It should be noted that the control according to the flowchart illustrated in FIG. 26 is also started by closing of an ignition switch (not illustrated in the drawings), and is repeatedly executed every predetermined time. Further, in FIG. 26, steps identical to the steps illustrated in FIG. 8 are denoted by the same step numbers as those in FIG. 8.

In this Third Embodiment, vehicle body roll angle control is executed based on a lateral acceleration Gy of the vehicle detected by a lateral acceleration sensor, which is not illustrated in FIG. 1. In particular, when the vehicle turns, as is the case with the conventional roll angle control based on the lateral acceleration of the vehicle, rolling toward the turning outer side of the vehicle body is reduced. When the vehicle travels on a laterally inclined road, however, a gain in the roll angle control with respect to the lateral acceleration of the vehicle is increased as compared with that upon turning, the roll angle of the vehicle body is controlled so as to be greater than 0 and smaller than the inclination angle of the traveling road.

More specifically, in this Third Embodiment, in step 1350, based on the determination whether an instruction for execution of vehicle body roll angle control is output from the cruise control unit of the electronic control device 16, it is determined whether vehicle body roll angle control when the vehicle is traveling on a laterally inclined road is necessary. When the result of the determination is negative, the control proceeds to step 1800, and when the result of the determination is affirmative, the control proceeds to step 1850.

Figure 27:
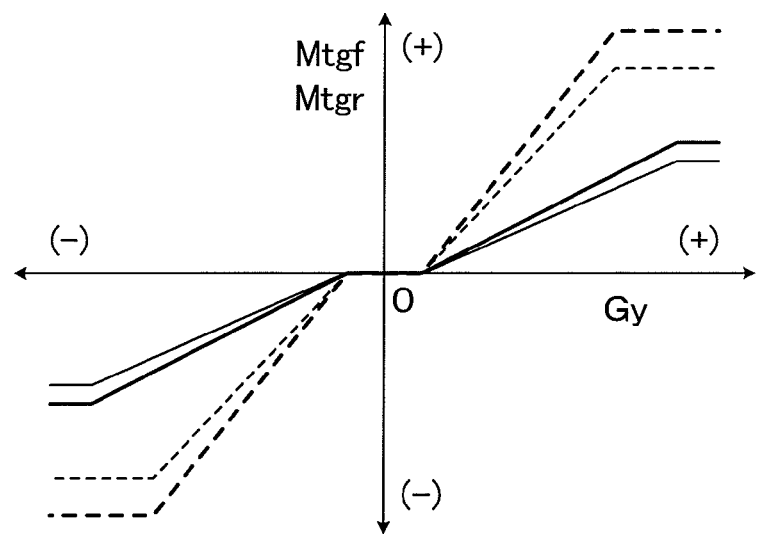
FIG. 27 is a map for calculation of target anti-roll moments Mtgf and Mtgr on the front wheel side and the rear wheel side based on a lateral acceleration Gy of a vehicle.

In step 1800, according to the map illustrated in FIG. 27 with indications by thick solid lines and thin solid lines based on the lateral acceleration Gy of the vehicle, target anti-roll moments Mtgf and Mtgr on the front wheel side and the rear wheel side for reducing rolling of the vehicle body upon turning are calculated. It should be noted that the configuration may be as follows: in an area where the magnitude of the lateral acceleration Gy of the vehicle is small, an estimated lateral acceleration Gyh of the vehicle is calculated based on the rudder angle δ of the front wheels based on the steering angle θ and the relative rotation angle θre as well as the vehicle speed V, and a target anti-roll moment is calculated based on the estimated lateral acceleration Gyh.

In step 1850, according to the map illustrated in FIG. 27 with indications by thick broken lines and thin broken lines based on the lateral acceleration Gy of the vehicle, target anti-roll moments Mtgf and Mtgr on the front wheel side and the rear wheel side when the vehicle travels on a laterally inclined road are calculated. In this case, the map is preferably set so that the target anti-roll moments Mtgf and Mtgr are set so that the inclination angle of the vehicle body should be calculated to be 0.2 to 0.8 times (both inclusive) the inclination angle αroad of the traveling road. In particular, the lower limit value of the foregoing angle range is preferably 0.3 times or more the same, and the upper limit value thereof is 0.7 times or less the same.

The map illustrated in FIG. 27 with indications by thick broken lines and thin broken lines may be uniform irrespective of the vehicle speed V, or alternatively, the map may be variably set so that the inclination of the map increases as the vehicle speed V is higher.

When step 1800 or 1850 is completed, the control proceeds to step 1900, and steps 1900 to 2000 are executed in the same manner as those in First Embodiment mentioned above. Further, the steps of cruise control routine and assist torque control routine are executed in the same manners as those in First Embodiment or Second Embodiment mentioned above.

According to this Third Embodiment, it is possible to achieve identical effects as those achieved in First and Second Embodiments, while reducing changes in the attitude of the vehicle body upon turning. In other words, in the case where trajectory control is executed in a situation in which the vehicle travels on a laterally inclined road, the occupant is effectively allowed to recognize the execution of trajectory control, the start and the end of trajectory control. Further, discomfort that the occupant feels during the execution of trajectory control, upon the start or the end of trajectory control can be reduced.

In particular, according to Third Embodiment, when the vehicle travels on a laterally inclined road, roll control based on lateral acceleration of the vehicle with a gain upon turning is executed, since before the conditions for start of roll angle control are satisfied. Therefore, considering the cases with identical lateral-direction inclination angles of the traveling road, the roll angle of the vehicle body when roll angle control is started is smaller than those in First and Second Embodiments. Therefore, a quantity of change in the roll angle of the vehicle body due to the execution of roll angle control is smaller than those in the cases of First and Second Embodiments, and hence the rotation angle of the steering wheel 20 and the change speed of the same are reduced. This allows the discomfort that the occupant feels to be reduced.

Further, according to Third Embodiment, when the vehicle travels on a laterally inclined road, roll control based on the lateral acceleration of the vehicle with a gain upon turning is executed, even if conditions for the end of roll angle control are satisfied. Therefore, considering the cases with identical lateral-direction inclination angles of the traveling road, the roll angle of the vehicle body when roll angle control at the time of traveling on a laterally inclined road is ended is smaller than those in First and Second Embodiments. Therefore, a quantity of change in the roll angle of the vehicle body due to the execution of roll angle control at the time of traveling on a laterally inclined road is smaller than those in the cases of First and Second Embodiments, and hence the rotation angle of the steering wheel 20 and the change speed of the same are reduced. This also allows the discomfort that the occupant feels to be reduced.

Further, according to Third Embodiment, it is unnecessary to calculate the target inclination angle αbtg of the vehicle body, the target anti-roll moments Mtgf and Mtgr, the target torques Ttgf and Ttgr, as well as the target rotation angles ψtgff and ψtgr, etc., for making the inclination angle of the vehicle body greater than 0 and smaller than the inclination angle of the road surface. Therefore, as compared with the cases of First and Second Embodiments in which the calculation of these values is necessary, calculation loads on the electronic control device 16 can be reduced, whereby the vehicle cruise control can be executed simply.

Further, according to Third Embodiment, as mentioned above, a quantity of change in the roll angle of the vehicle body upon the start and the end of roll angle control is smaller than those in First and Second Embodiments. Therefore, in the case where cruise control routine is executed in the same manner as that in Second Embodiment mentioned above, delays of the start and the end of trajectory control with respect to those of roll angle control can be shortened.

It should be noted that according to each embodiment mentioned above, the target rudder angles of the front and rear wheels are corrected with respect to changes of the rudder angles due to roll steer. Therefore, even in the case where the lateral-direction inclination angle of the traveling road is great and roll steer due to roll angle control increases, the target rudder angles of the front and rear wheels can be calculated accurately, which causes the vehicle to accurately travel along the target trajectory.

As is clear from the foregoing description, according to each embodiment mentioned above, in the case where trajectory control is executed in a situation in which the vehicle travels on a laterally inclined road, it is possible to surely cause the occupant to recognize that the trajectory control is executed, and the start and the end of trajectory control. Further, by reducing the rotation angle of the steering wheel and the speed thereof during the execution of trajectory control or upon the start or the end of trajectory control, and by suppressing the meandering of the vehicle upon the start and the end of trajectory control, discomfort that the occupant feels can be reduced.

So far the present invention is described in detail regarding particular embodiments, but it will be evident to those skilled in the art that the present invention is not limited to the above-described embodiments, and other various embodiments should be possible within the scope of the present invention.

For example, in each embodiment mentioned above, an absolute roll angle $\alpha ab$ of the vehicle body is calculated as a sum of the integral value $\omega rint$ of the roll rate $\omega r$ of the vehicle during a period from when the vehicle starts traveling until the current time and the initial value $\alpha 0$ of the roll angle of the vehicle body. However, the absolute roll angle $\alpha ab$ of the vehicle body may be detected by a detection device such as a gyroscopic inclination angle sensor.

Further, the absolute roll angle $\alpha ab$ of the vehicle body may be estimated as a difference $Gy-\gamma V$ between the lateral acceleration $Gy$ of the vehicle and the product of the yaw rate $\gamma$ of the vehicle and the vehicle speed $V$. Alternatively, the configuration may be such that the estimated lateral acceleration $Gyh$ of the vehicle is calculated based on the steering angle $\theta$ and the vehicle speed $V$ from a vehicle model, and the absolute roll angle may be estimated as $Gy-Gyh$, which is a difference between the lateral acceleration $Gy$ of the vehicle and the estimated lateral acceleration $Gyh$.

Still further, in each embodiment mentioned above, the roll control device is configured so as to control the roll angle of the vehicle body by generating an anti-roll moment by the active stabilizers 56 and 58. However, the roll control device, for example, may be an active suspension, an air suspension having a vehicle height adjusting function, or the like, as long as the lateral-direction inclination angle of the vehicle body can be controlled.

Further, in each embodiment mentioned above, the curvature R (reciprocal of radius) of the target trajectory, the lateral direction deviation Y of the vehicle with respect to the target trajectory and the deviation $\phi$ of the yaw angle are calculated, the target rudder angles of the front and rear wheels based on these are calculated, and the rudder angles of the front and rear wheels are controlled so as to coincide with the target rudder angles, respectively. However, trajectory control may be at least capable of causing the vehicle to travel along a traveling road by steering wheels, and may have any arbitrary configuration, such as a lane deviation preventing mechanism for controlling the rudder angle of the steerable wheels so that the vehicle should not deviate from the lane.

Further, each embodiment mentioned above is configured so that the rudder angles of the front and rear wheels are controlled, but the control of the rudder angle of the rear wheels does not have to be performed. Further, the rudder angle of the front wheels is controlled by rotation of the lower steering shaft 30 caused by the rudder angle varying device 14 relatively with respect to the upper steering shaft 28. The rudder angle of the front wheels may be controlled by a rudder angle varying device of an arbitrary configuration, for example, a steering-by-wire-type steering device.

Further, Second Embodiment mentioned above is configured so that trajectory control is started with a delay to roll angle control and trajectory control is ended with a delay to roll angle control. But the configuration may be modified so that trajectory control is started simultaneously with roll angle control, but trajectory control is started substantially with a delay to roll angle control by suppressing an increase in the control quantity for the same upon the starting of trajectory control. Likewise, the configuration may be modified so that the ending of trajectory control and the ending of roll angle control are simultaneously started, but trajectory control is ended substantially with a delay to roll angle control by suppressing a decrease in the control quantity for the same upon the ending of trajectory control.

The invention claimed is:

1. A vehicle cruise control device that performs trajectory control for causing a vehicle to travel along a traveling road by steering a wheel, the vehicle cruise control device comprising:
    a roll control device configured to control a lateral-direction inclination angle of a vehicle body; and
    an inclination determination device configured to determine a lateral-direction inclination of a traveling road,
    wherein, when the trajectory control is executed in a situation in which the vehicle travels on a laterally inclined traveling road, the lateral-direction inclination angle of the vehicle body is controlled by the roll control device so that the lateral-direction inclination angle of the vehicle body is greater than 0 and smaller than the lateral-direction inclination angle of the traveling road.

2. The vehicle cruise control device, according to claim 1, wherein:
    when starting the trajectory control in the situation in which the vehicle travels on the laterally inclined traveling road, the cruise control device starts the control of the lateral-direction inclination angle of the vehicle body by the roll control device as well at the same time, and gradually increases a control quantity for the lateral-direction inclination angle of the vehicle body.

3. The vehicle cruise control device according to claim 1, wherein:
    when ending the trajectory control in the situation in which the vehicle travels on the laterally inclined traveling road, the cruise control device starts the ending of the control of the lateral-direction inclination angle of the vehicle body by the roll control device as well at the same time, and gradually decreases a control quantity for the lateral-direction inclination angle of the vehicle body.

4. The vehicle cruise control device according to claim 1, wherein:
    when starting the trajectory control in the situation in which the vehicle travels on the laterally inclined traveling road, the cruise control device starts the control of the lateral-direction inclination angle of the vehicle body by the roll control device in advance to the starting of the trajectory control, and gradually increases a control quantity for the lateral-direction inclination angle of the vehicle body.

5. The vehicle cruise control device according to claim 1, wherein:
when ending the trajectory control in the situation in which the vehicle travels on the laterally inclined traveling road, the cruise control device starts the ending of the control of the lateral-direction inclination angle of the vehicle body by the roll control device in advance to the ending of the trajectory control, and gradually decreases a control quantity for the lateral-direction inclination angle of the vehicle body.

6. The vehicle cruise control device according to claim 1, wherein:
the inclination determination device estimates the lateral-direction inclination angle of the traveling road, and
the cruise control device calculates a target inclination angle of the vehicle body that is greater than 0 and smaller than the lateral-direction inclination angle of the traveling road, and controls the lateral-direction inclination angle of the vehicle body so that the lateral-direction inclination angle of the vehicle body coincides with the target inclination angle.

7. The vehicle cruise control device according to claim 6, wherein:
the inclination determination device estimates a lateral-direction inclination angle of the vehicle body in an absolute space as an absolute roll angle, estimates a lateral-direction inclination angle of the vehicle body with respect to the traveling road as a relative roll angle, and estimates the lateral-direction inclination angle of the traveling road based on a difference between the absolute roll angle and the relative roll angle.

8. The vehicle cruise control device according to claim 1, wherein:
the roll control device generates an anti-roll moment based on a lateral force working on the vehicle body, thereby to control the lateral-direction inclination angle of the vehicle body, and
when executing the trajectory control in the situation in which the vehicle travels on the laterally inclined traveling road, the cruise control device increases a ratio of the anti-roll moment to the lateral force working on the vehicle body, as compared with a situation that is not the situation in which the vehicle travels on the laterally inclined traveling road, thereby to control the lateral-direction inclination angle of the vehicle body so that the lateral-direction inclination angle of the vehicle body is greater than 0 and smaller than the lateral-direction inclination angle of the traveling road.

9. The vehicle cruise control device according to claim 1, wherein:
the cruise control device controls the lateral-direction inclination angle of the vehicle body so that the lateral-direction inclination angle of the vehicle body is equal to or more than 0.2 times the lateral-direction inclination angle of the traveling road, and equal to or less than 0.8 times the lateral-direction inclination angle of the traveling road.

* * * * *